(12) United States Patent
O'Neill

(10) Patent No.: US 11,486,103 B2
(45) Date of Patent: *Nov. 1, 2022

(54) RETROREFLECTIVE TRAFFIC STRIPE 1,000X BRIGHTER THAN THE CURRENT STATE OF THE ART

(71) Applicant: Mark Joseph O'Neill, Keller, TX (US)

(72) Inventor: Mark Joseph O'Neill, Keller, TX (US)

(*) Notice: Subject to any disclaimer, the term of this patent is extended or adjusted under 35 U.S.C. 154(b) by 141 days.

This patent is subject to a terminal disclaimer.

(21) Appl. No.: 16/988,891

(22) Filed: Aug. 10, 2020

(65) Prior Publication Data

US 2021/0381178 A1 Dec. 9, 2021

Related U.S. Application Data

(63) Continuation of application No. 16/891,258, filed on Jun. 3, 2020, now Pat. No. 10,794,021.

(51) Int. Cl.
*E01F 9/524* (2016.01)
*E01F 9/512* (2016.01)
*G02B 5/124* (2006.01)

(52) U.S. Cl.
CPC ............ *E01F 9/524* (2016.02); *E01F 9/512* (2016.02); *G02B 5/124* (2013.01)

(58) Field of Classification Search
CPC . E01F 9/506; E01F 9/512; E01F 9/524; E01F 9/576; E01F 9/578; G02B 5/122; G02B 5/124
USPC ..................................................... 404/12–16
See application file for complete search history.

(56) References Cited

U.S. PATENT DOCUMENTS

| | | | | |
|---|---|---|---|---|
| 2,310,790 A | * | 2/1943 | Jungersen | G02B 5/12 342/7 |
| 3,587,415 A | * | 6/1971 | Eigenmann | E01F 9/578 404/94 |
| 3,975,083 A | * | 8/1976 | Rowland | E01F 9/578 359/531 |
| 4,145,112 A | * | 3/1979 | Crone | E01F 9/512 359/531 |
| 4,236,788 A | * | 12/1980 | Wyckoff | E01F 9/578 359/551 |
| 4,332,437 A | * | 6/1982 | Searight | G02B 5/12 359/531 |

(Continued)

*Primary Examiner* — Raymond W Addie

(57) ABSTRACT

This invention is a novel retroreflective traffic stripe comprising a widely spaced repeating pattern of linear light turning prisms over cube corner retroreflective prisms in a critical optimal configuration. The light turning prisms comprise at least two exposed surfaces, one approximately vertical facing the headlights of oncoming traffic, and another opposing the first and sloped by approximately 45 degrees. The approximately vertical surface efficiently accepts light from the headlights and transmits such light to the sloped surface which totally internally reflects such light downward onto an array of cube corner retroreflective prisms, which totally internally reflect such light in approximately the reverse direction. Such reflected light once more encounters the sloped face of the light turning prisms which totally internally reflects the light toward the approximately vertical surface, where such light exits and returns toward the headlights and, more importantly, toward the eyes of the driver of the vehicle.

19 Claims, 18 Drawing Sheets

Fig. 14-A Concrete Barrier Application

Fig. 14-B Guard Rail Application

(56) References Cited

U.S. PATENT DOCUMENTS

| | | | | |
|---|---|---|---|---|
| 4,349,598 A * | 9/1982 | White | | E01F 9/578 359/530 |
| 4,895,428 A * | 1/1990 | Nelson | | G02B 5/124 359/530 |
| 4,938,563 A * | 7/1990 | Nelson | | G02B 5/124 359/530 |
| 5,237,449 A * | 8/1993 | Nelson | | G02B 5/126 359/542 |
| 5,501,545 A * | 3/1996 | Walter | | E01F 9/553 359/531 |
| 5,706,132 A * | 1/1998 | Nestegard | | G02B 5/124 359/530 |
| 5,734,501 A * | 3/1998 | Smith | | G02B 5/124 359/530 |
| 5,759,468 A * | 6/1998 | Smith | | G02B 5/124 264/19 |
| 6,021,559 A * | 2/2000 | Smith | | B29D 11/00605 359/530 |
| 6,282,026 B1 * | 8/2001 | Dreyer | | G02B 5/124 359/530 |
| 6,967,053 B1 * | 11/2005 | Mullen | | A42B 3/061 359/530 |
| 8,268,435 B2 * | 9/2012 | Huang | | G02B 5/124 428/156 |
| 9,010,945 B2 * | 4/2015 | Vasylyev | | G02B 5/124 359/530 |
| 9,638,843 B2 * | 5/2017 | Katano | | G02B 5/136 |
| 10,794,021 B1 * | 10/2020 | O'Neill | | E01F 9/524 |
| 11,124,932 B1 * | 9/2021 | O'Neill | | G02B 1/04 |
| 2002/0006313 A1 * | 1/2002 | Pas | | E01F 9/20 404/9 |
| 2012/0050876 A1 * | 3/2012 | Sugiyama | | B29D 11/00605 359/625 |
| 2018/0267216 A1 * | 9/2018 | Otsubo | | G03B 35/24 |
| 2020/0048847 A1 * | 2/2020 | Retterath | | G02B 5/124 |

* cited by examiner

Fig. 1
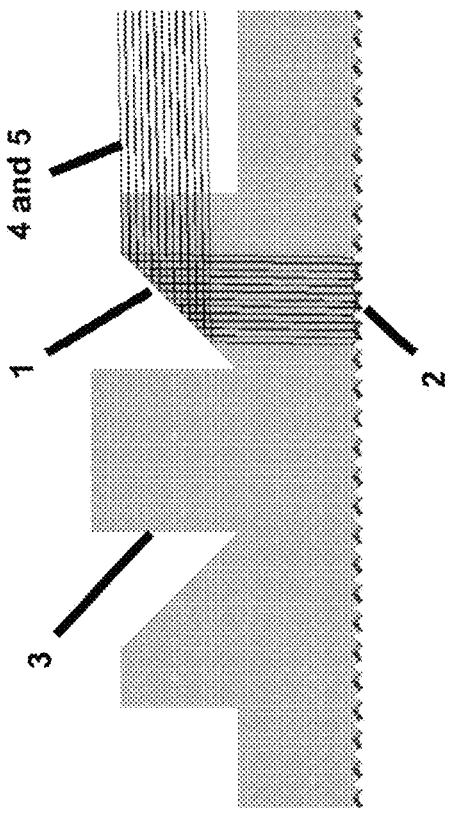
Fig. 1-B Cross Section of Light-Turning Prisms over Cube Corner Prisms
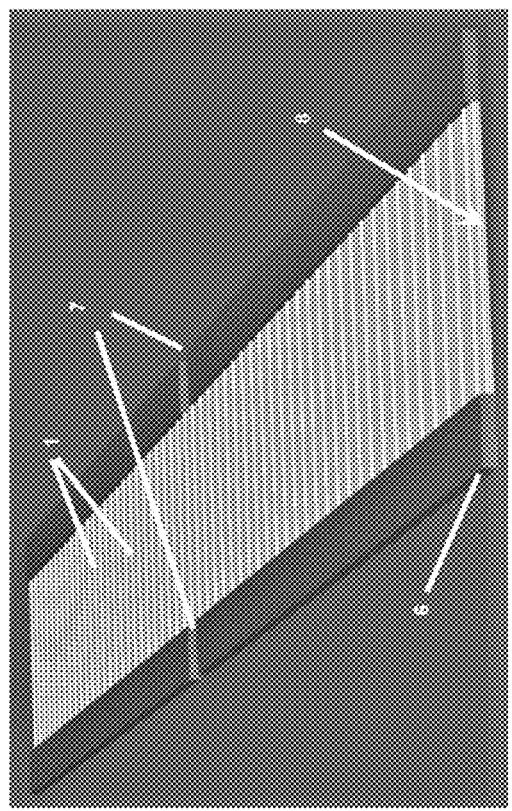
Fig. 1-A Driver's View of New Road Stripe from Vehicle
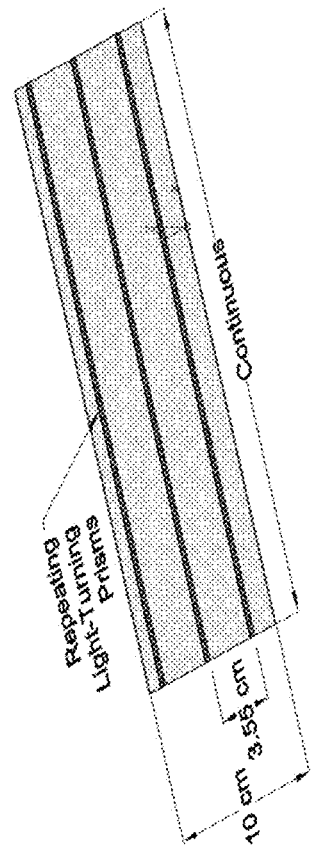
Fig. 1-D Repeating Pattern for Lateral Road Stripes
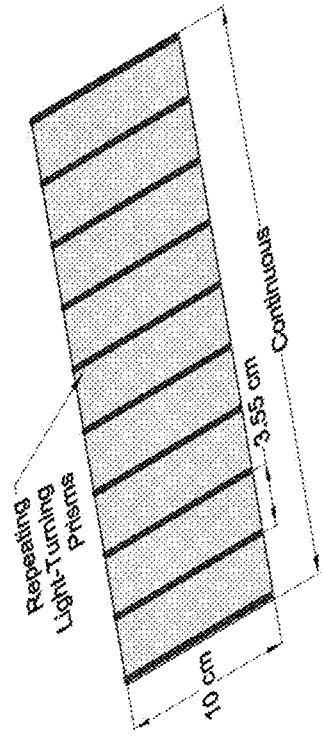
Fig. 1-C Repeating Pattern for Longitudinal Road Stripes Fig. 2
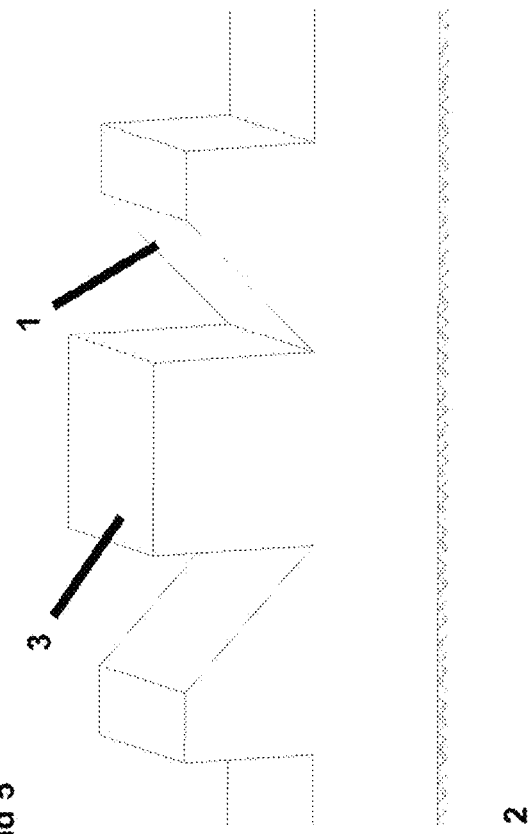
Fig. 2-A Transparent Top View with Rays
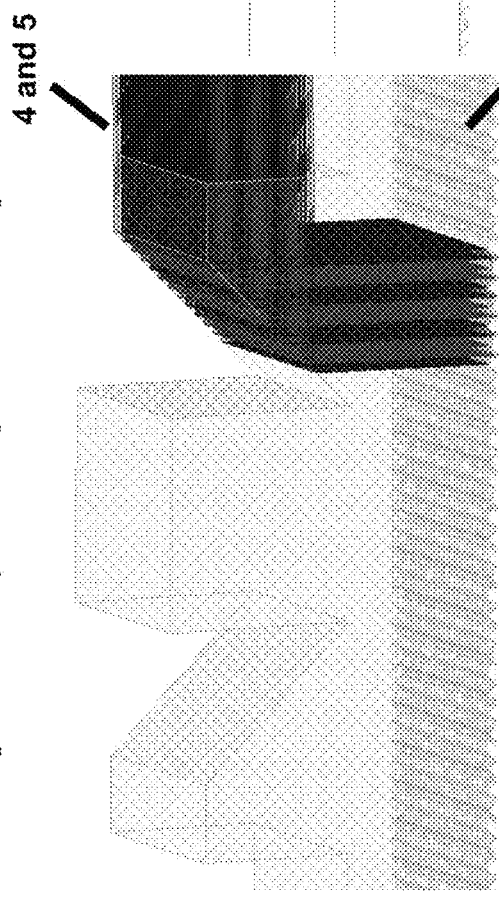
Fig. 2-B Top Isometric View No Rays
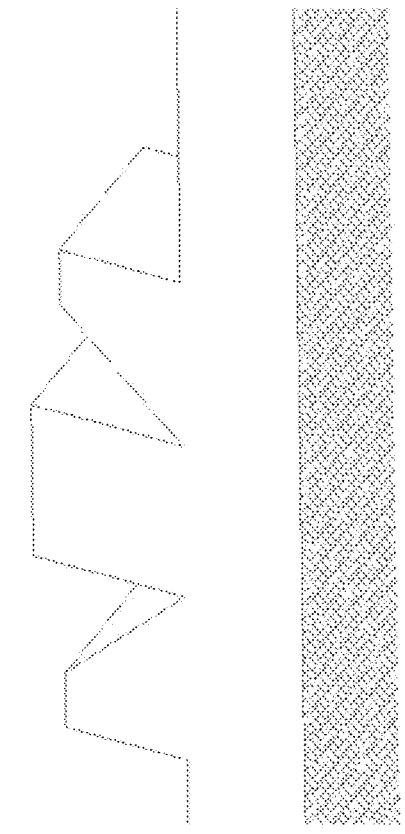
Fig. 2-C Transparent Bottom View with Rays
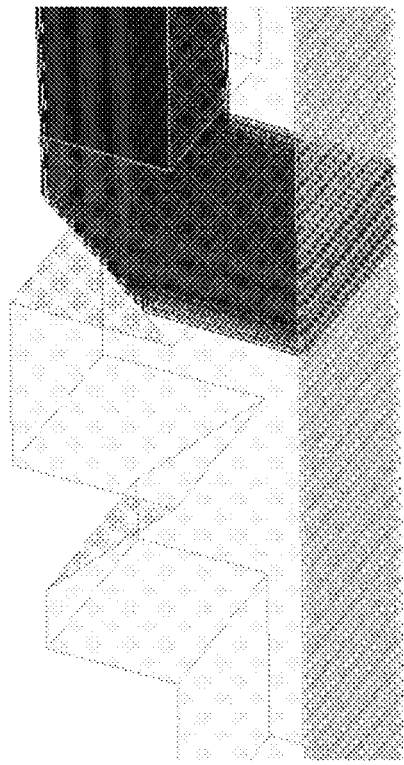
Fig. 2-D Bottom Isometric View No Rays

Fig. 3
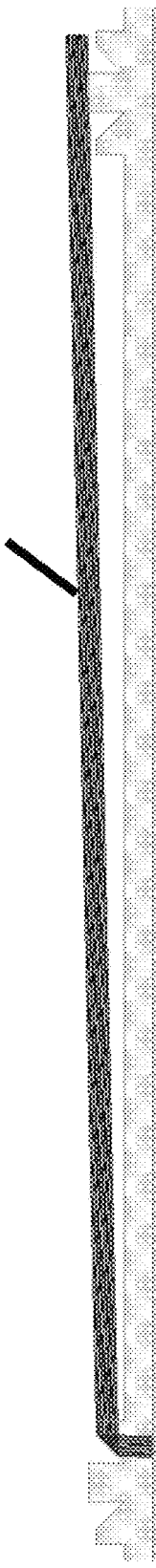
Fig. 3-A Cross Section with Rays
Fig. 3-B Cross Section with Rays of Light-Turning Prism
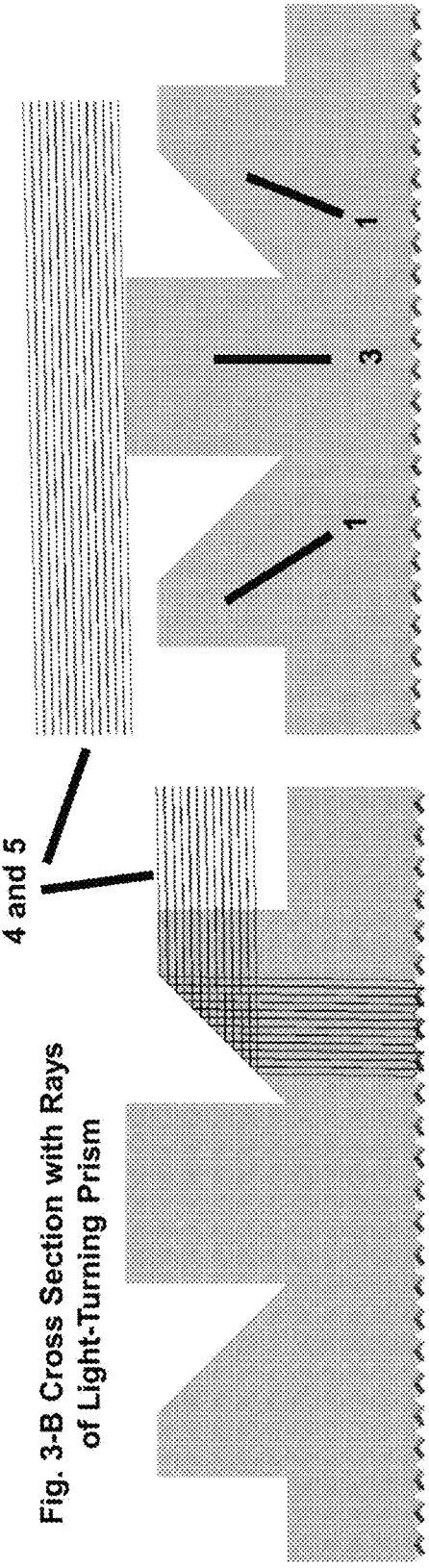
Fig. 3-C Cross Section with Rays of Adjacent Light-Turning Prism
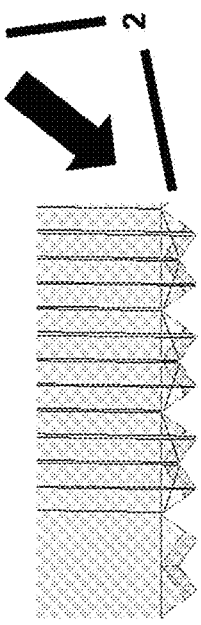

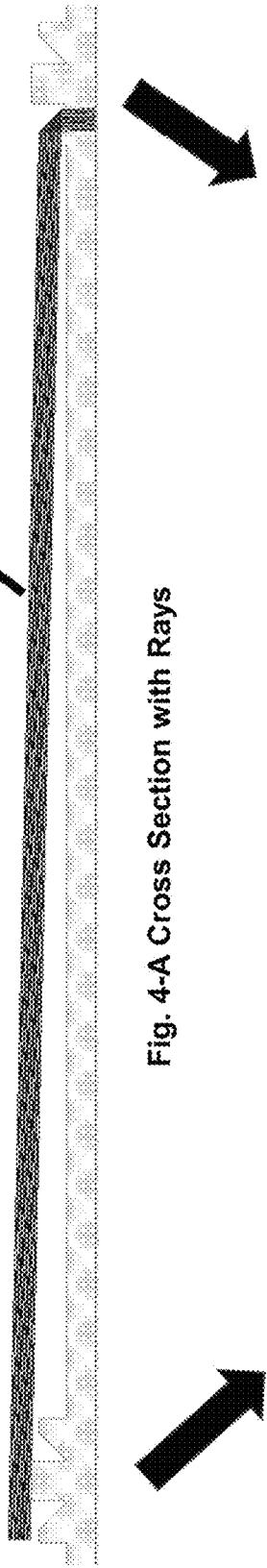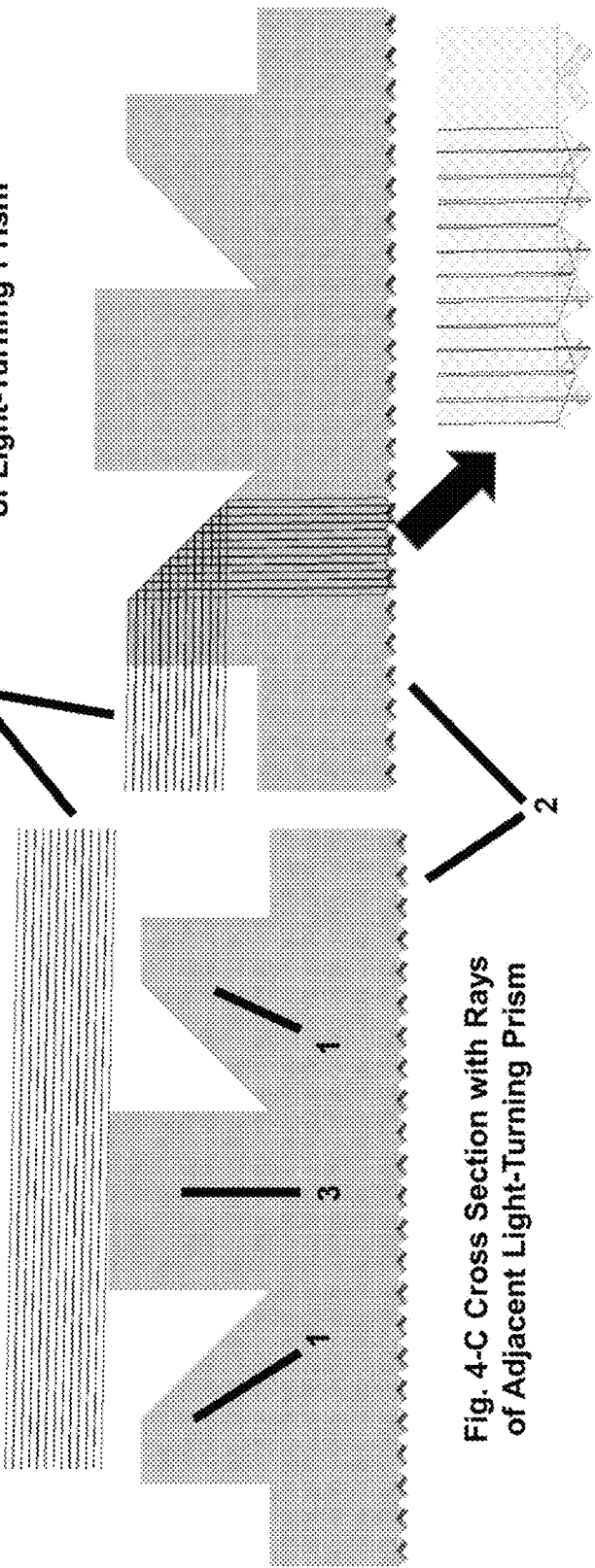

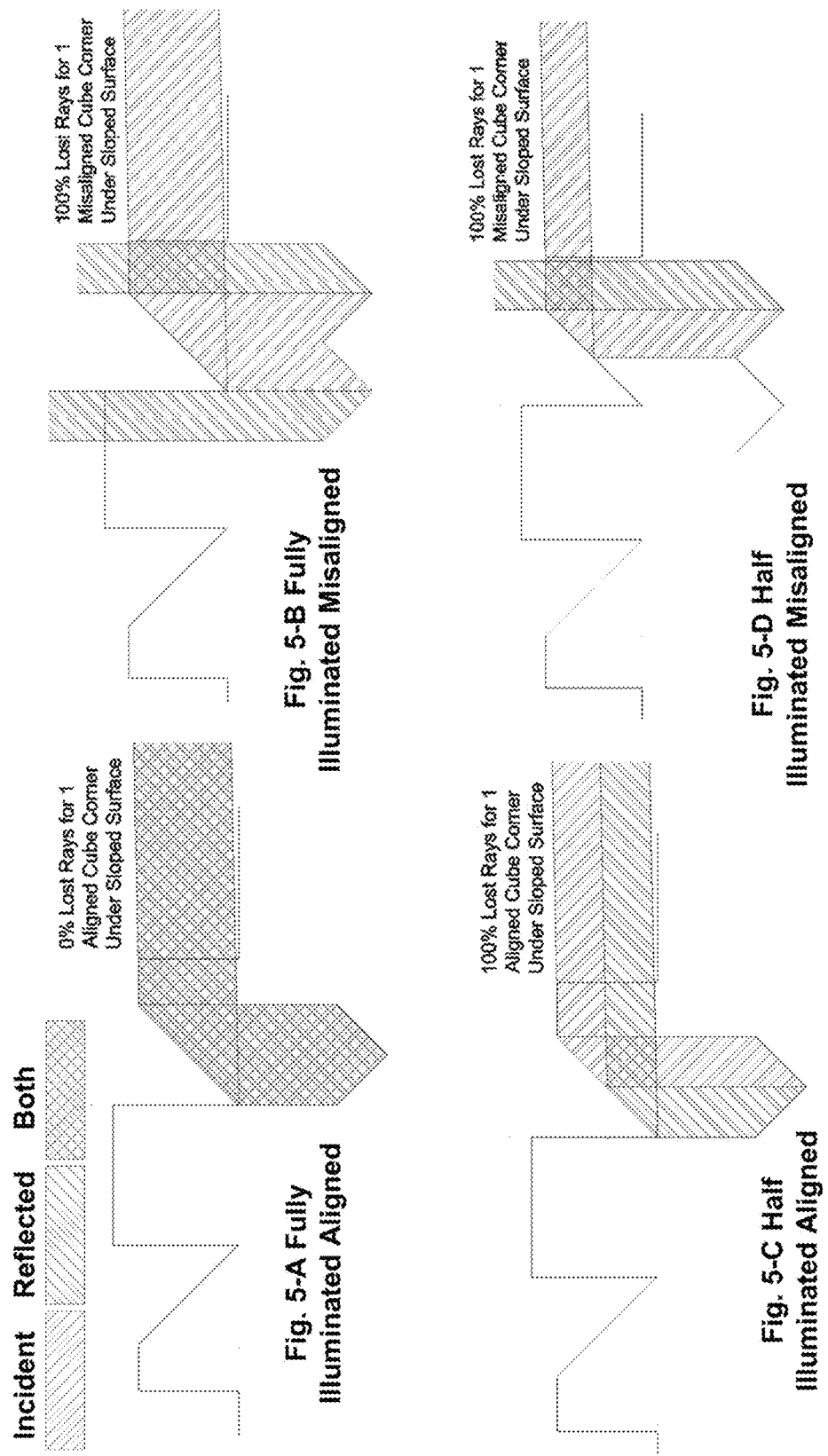

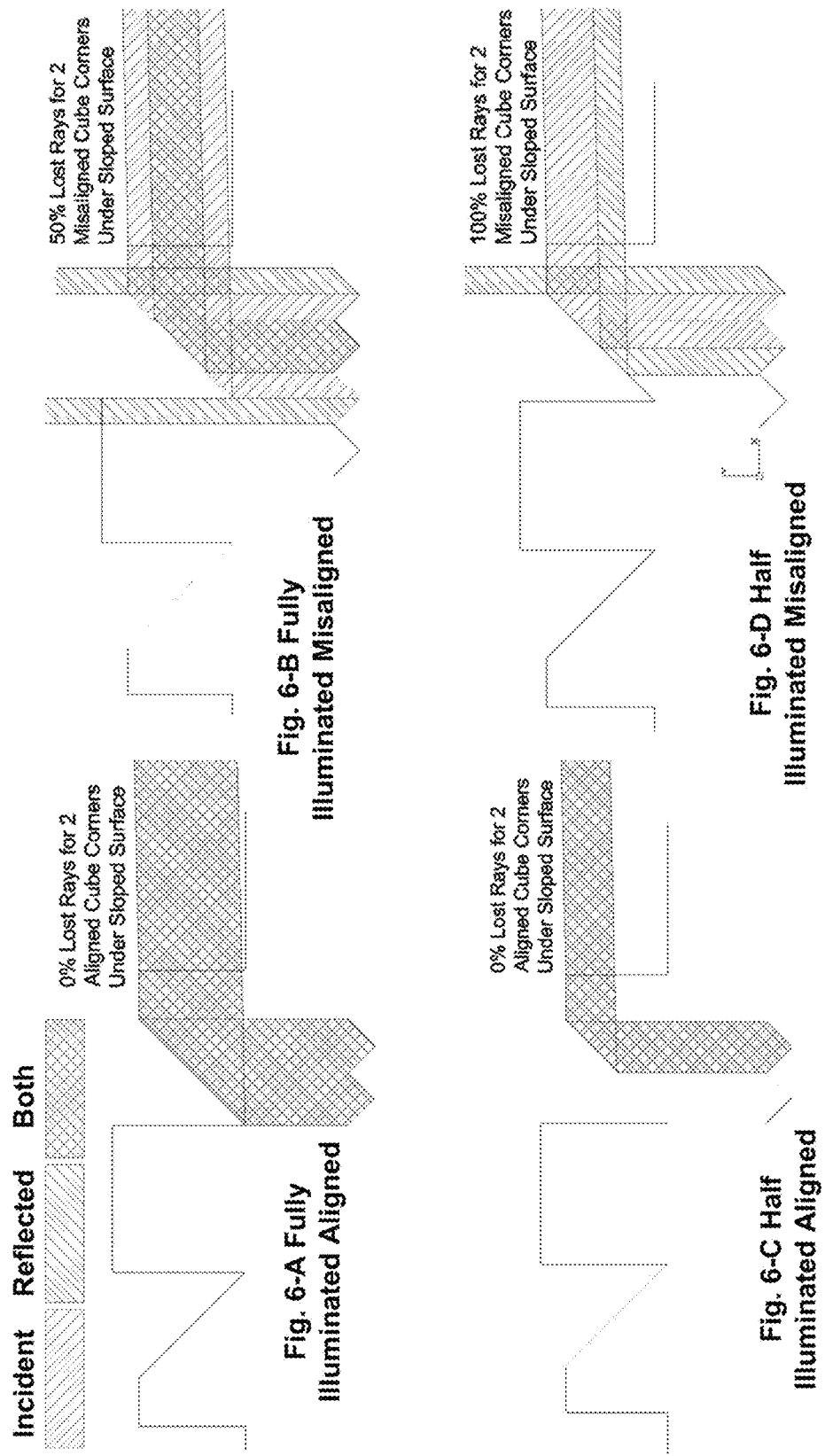

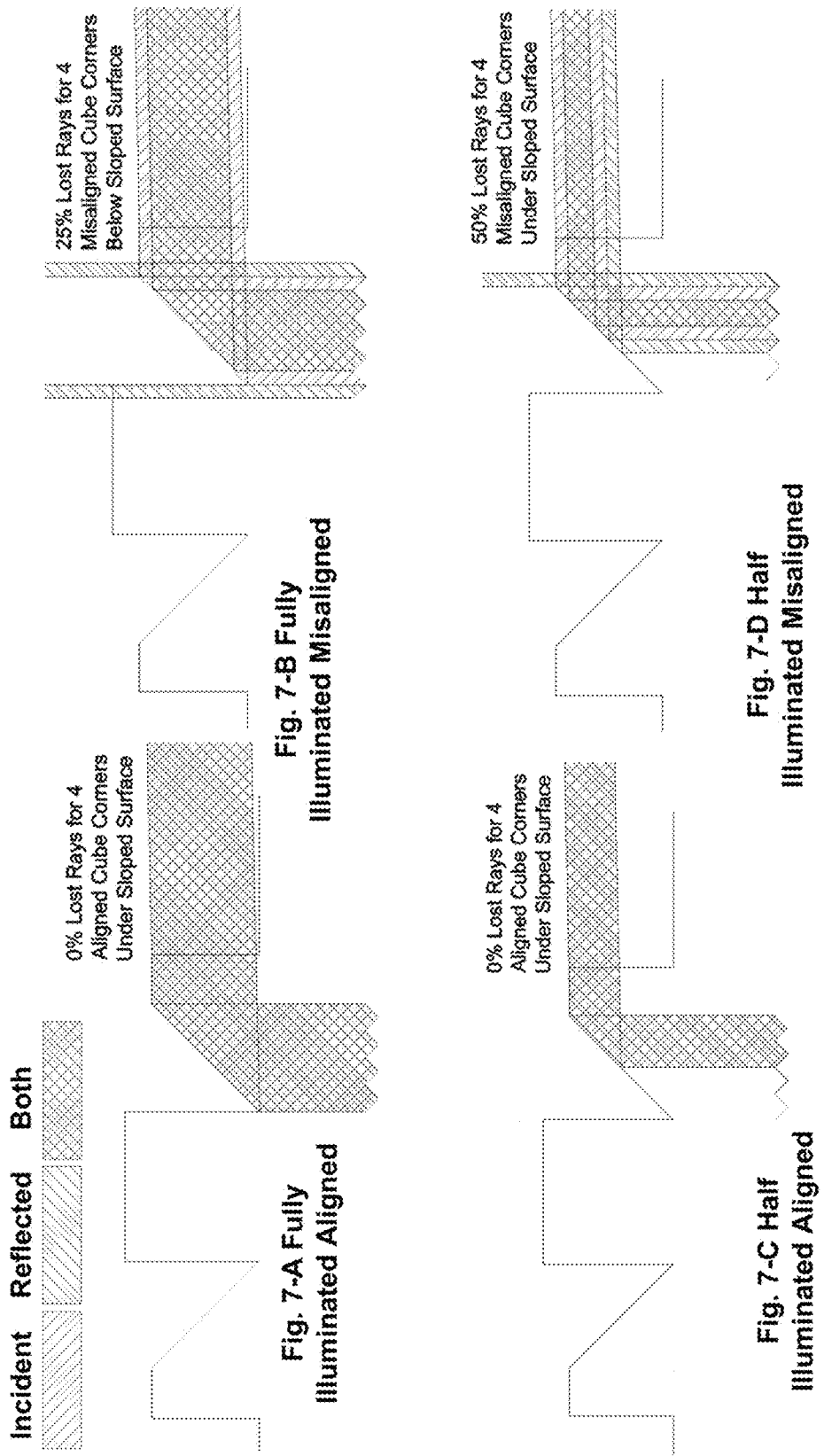

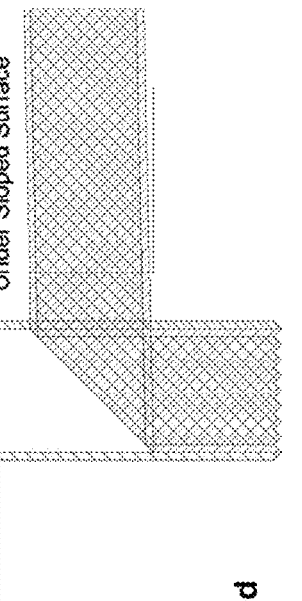
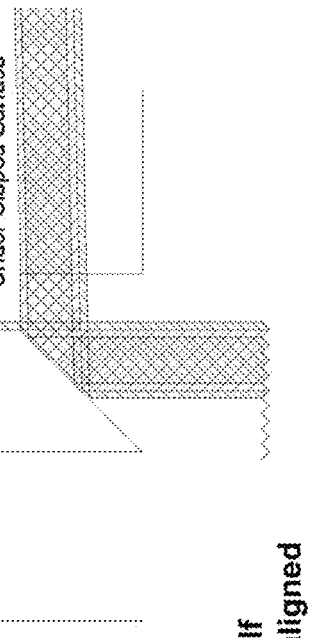
Fig. 8
8 Cube Corners Under Sloped Surface of Light-Turning Prism

Fig. 9
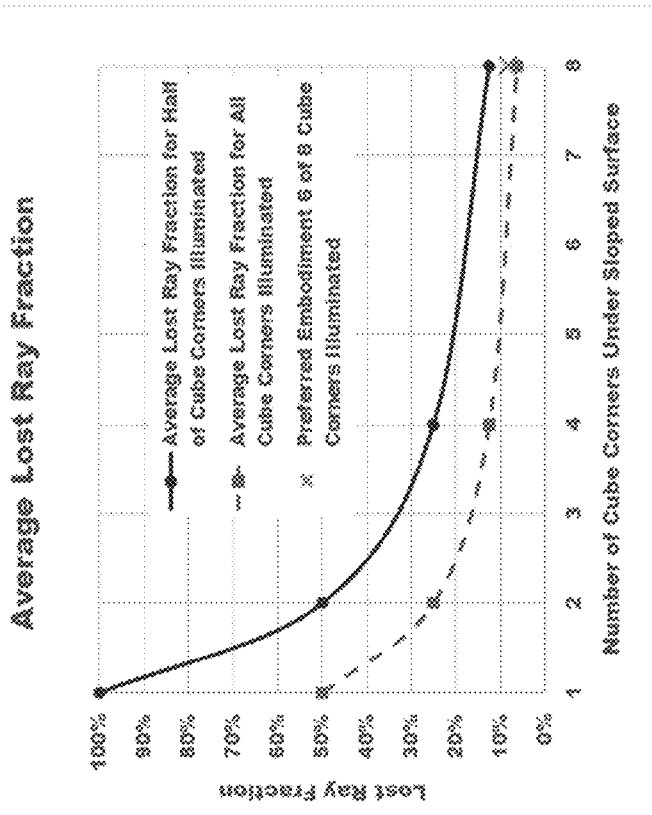
Fig. 9-B
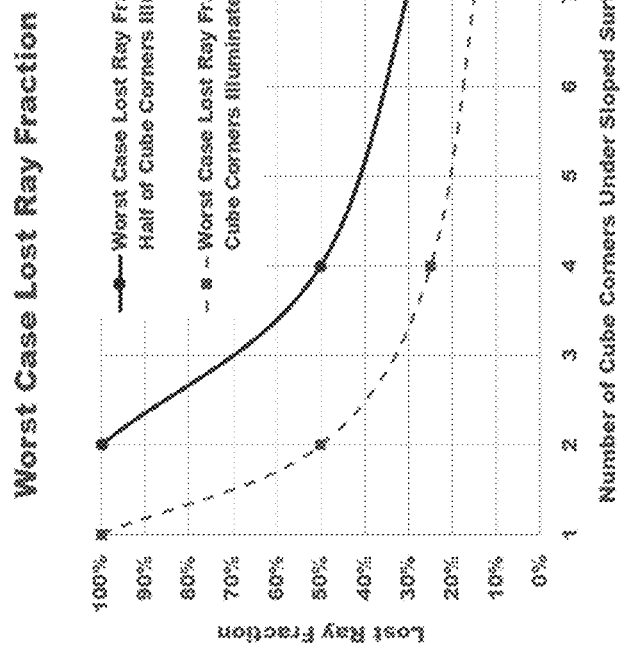
Fig. 9-A

Fig. 10-A Undamaged and Clean
1,000X Brighter than FHWA Target Value

Fig. 10-B Damaged and Dirty
667X Brighter than FHWA Target Value

Fig. 11
Fig. 11-A Without Rays
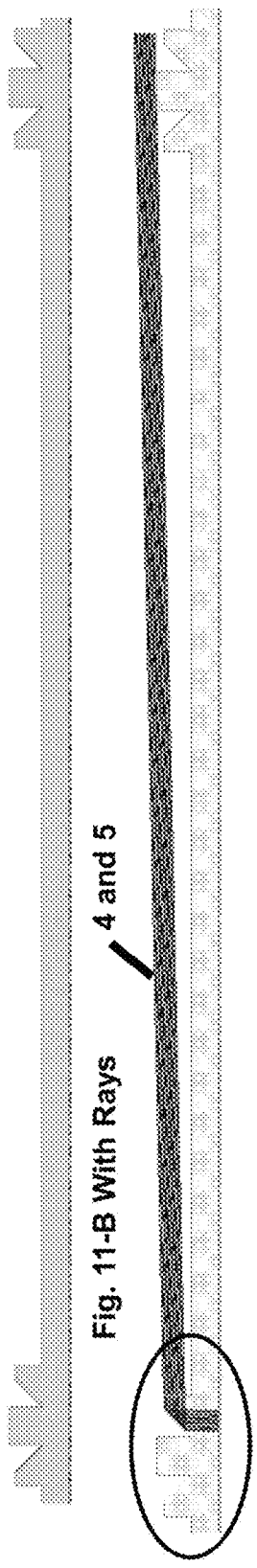
Fig. 11-B With Rays
Fig. 11-C Blow-Up
Design Rules: $\frac{L1}{L2} \geq 6$  $Nillum \geq 3$  $S = \frac{Hmax - L1 + Nillum\, L2}{\tan(1.24°)} + L1 + L3 + L4$
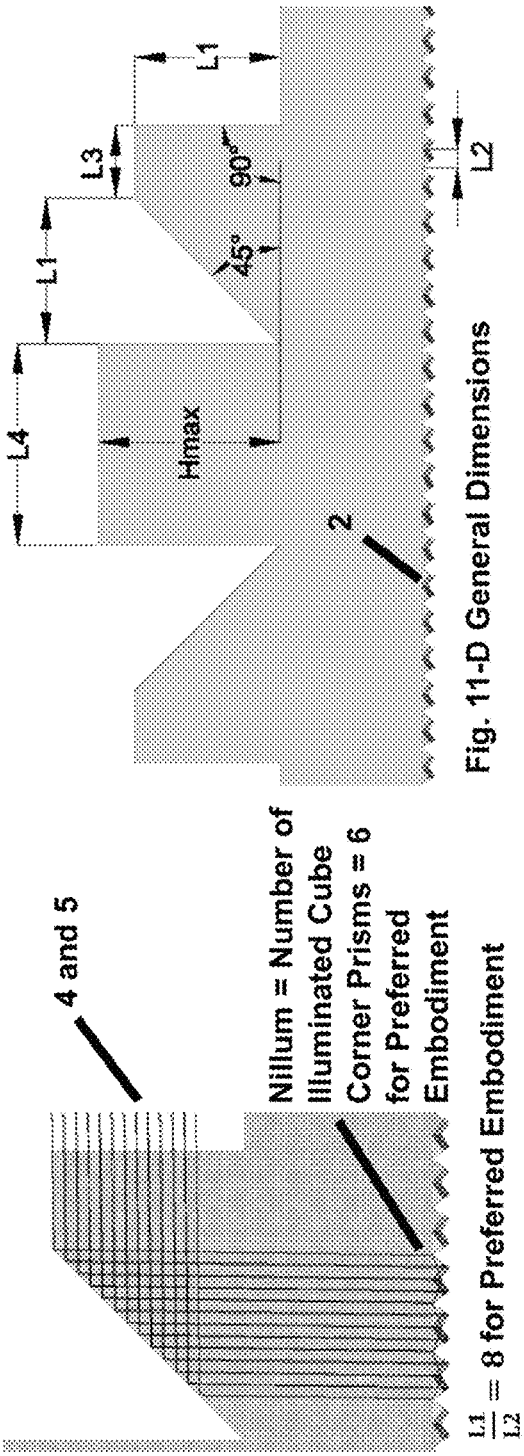
Nillum = Number of Illuminated Cube Corner Prisms = 6 for Preferred Embodiment
$\frac{L1}{L2} = 8$ for Preferred Embodiment
Fig. 11-D General Dimensions

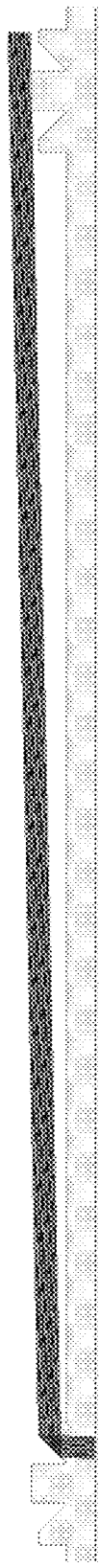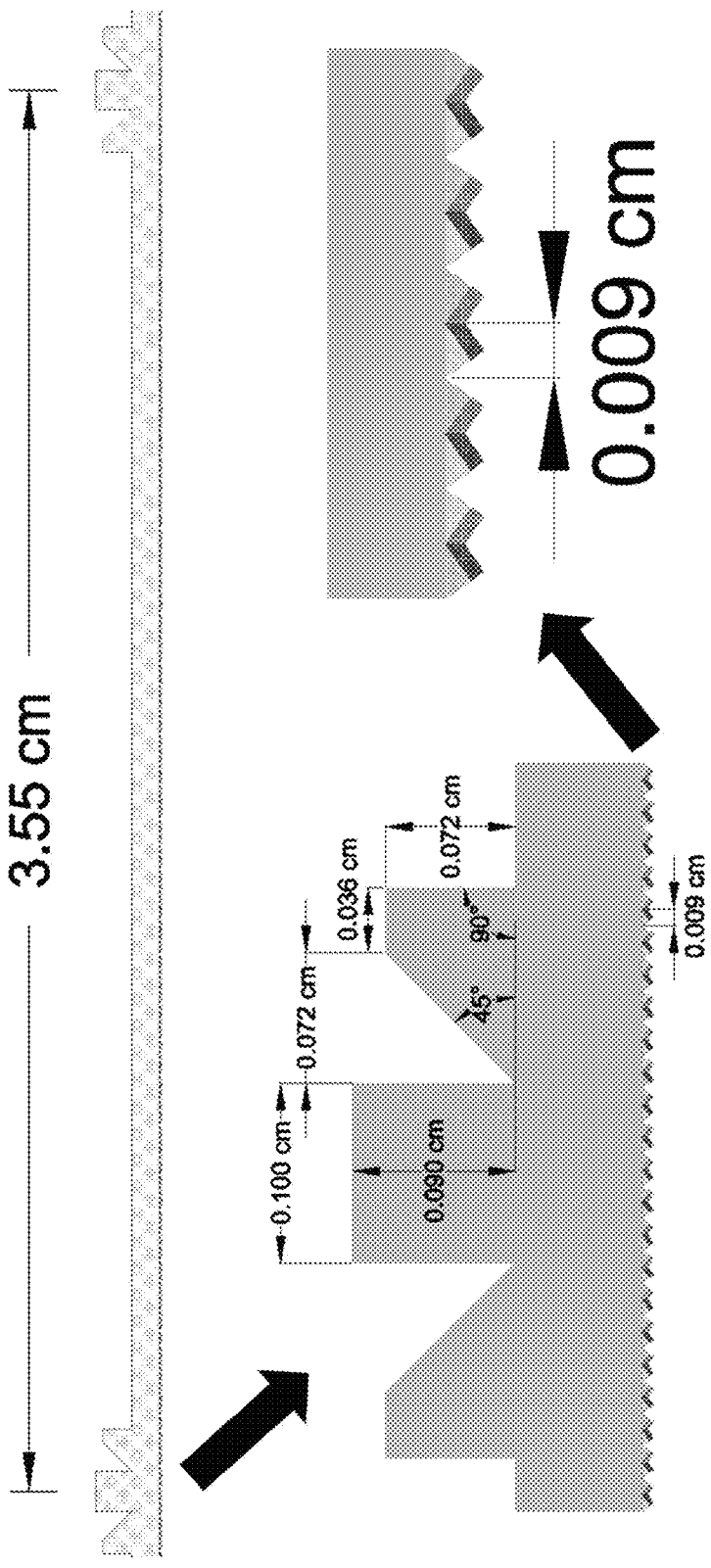
Fig. 12

Fig. 13

Many State DOTs and a Proposed FHWA Rule Have Targeted Minimum Retroreflectivity Values > 100 mcd/m²-lx for Highway Stripes on 70 mph Roads

Pavement Markings At Various Retroreflectivity Levels

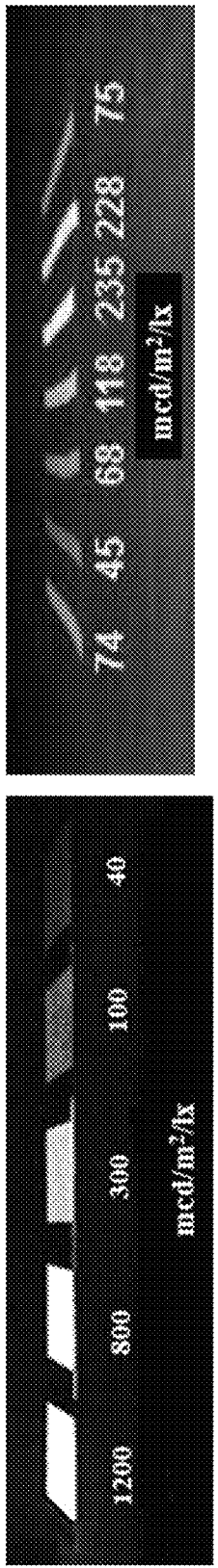

Opiela, K.S., "Status Report: Minimum Levels Of Retroreflectivity for Traffic Signs & Pavement Markings," Federal Highway Administration, U.S. Department of Transportation, Juneau, AK, 2004

Paul J. Carlson et al., "Methods for Maintaining Pavement Marking Retroreflectivity," Federal Highway Administration, U.S. Department of Transportation, Texas A&M TTI, 2014

Compare to the Retroreflective Film Used at the Bottom Surface of the Present Innovation

| Minimum Retroreflectance for White Type XI Prismatic Road Sign Sheeting for -4 degree Incidence per ASTM D49562 | |
|---|---|
| Observation Angle | Retroreflectance |
| 0.1 deg | 830,000 mcd/sq.m.-lux |
| 0.2 deg | 580,000 mcd/sq.m.-lux |
| 0.5 deg | 420,000 mcd/sq.m.-lux |
| 1.0 deg | 120,000 mcd/sq.m.-lux |

1,000X Higher than Targeted Minimums

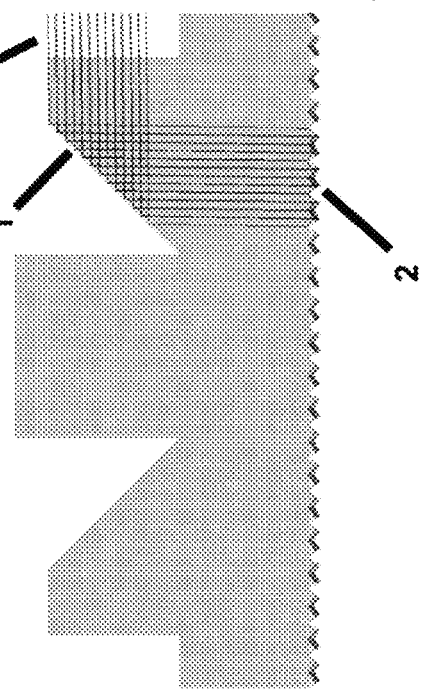

Total Optical Losses Will Be Less than 10% with Proper Design

Fig. 14-A Concrete Barrier Application    Fig. 14-B Guard Rail Application

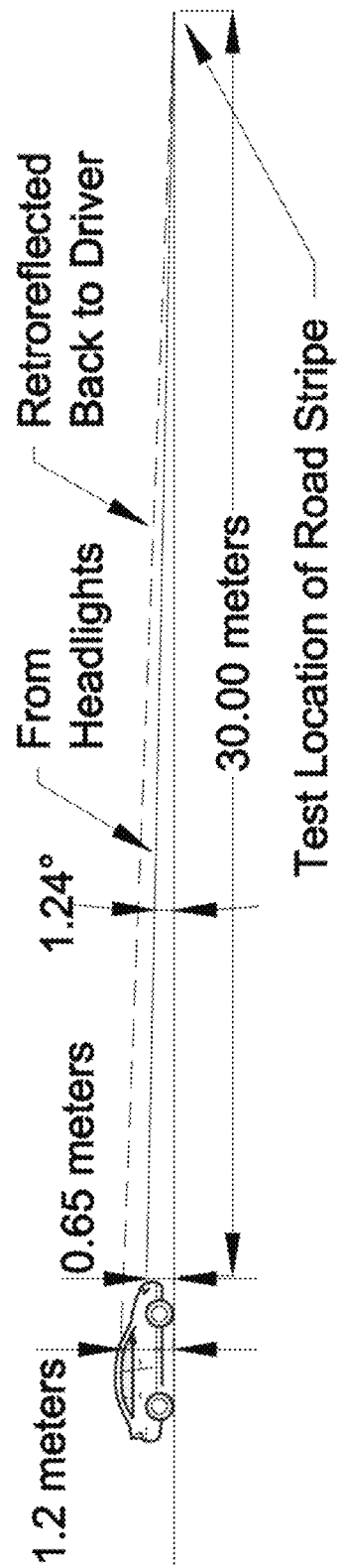

Fig. 15

ASTM 1710 Test for Road Stripe Retroreflectivity

Proposed Brightness Rule from FHWA

"Update on FHWA Rulemaking for Pavement Marking Retroreflectivity," Cathy Satterfield, FHWA Office of Safety, AHD-55 Webinar, March 29, 2018

Minimum Retroreflectivity Values, SNPA Proposed Amendment to MUTCD Section 3A.03:

Use a method designed to maintain retroreflectivity of longitudinal markings at or above:

Standard: 50 mcd/m²/lx – Speed Limits 35 mph or greater
Guidance: 100 mcd/m²/lx – Speed Limits 70 mph or greater Note: These numbers apply to dry markings per Federal Register notice

Fig. 16
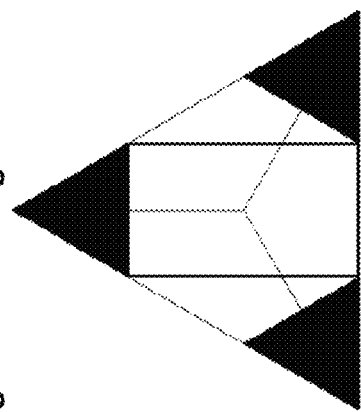
Fig. 16-C Rectangular Full-Cube
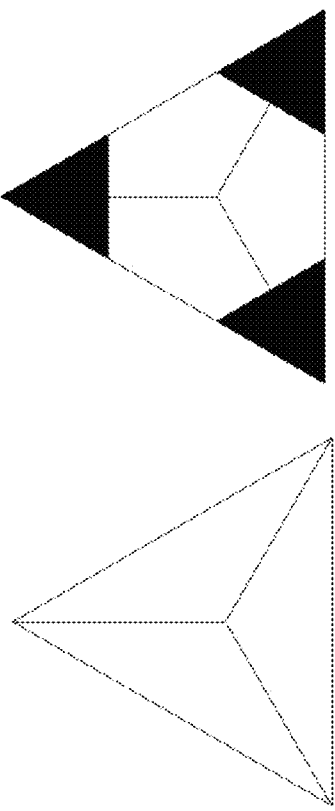
Fig. 16-B Dead Areas in Black
Fig. 16-A Cube Corner
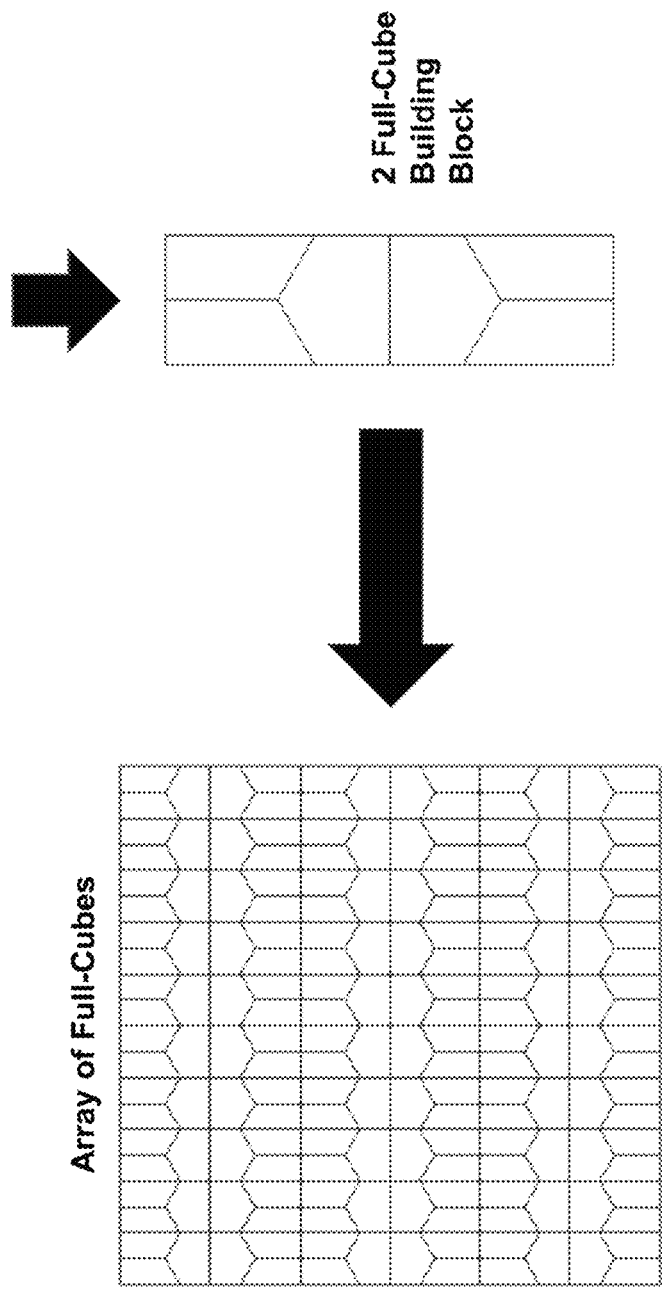
2 Full-Cube Building Block
Array of Full-Cubes

Fig. 17
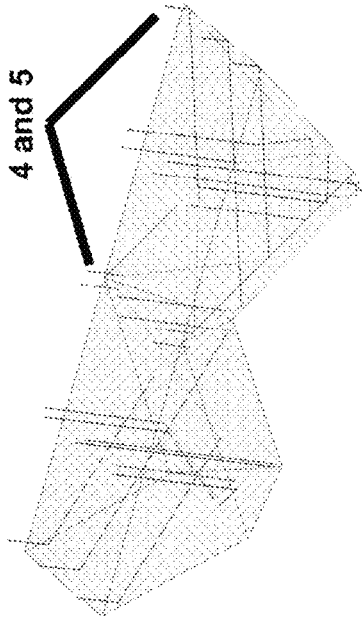
Fig. 17-A 2 Full-Cube Building Block
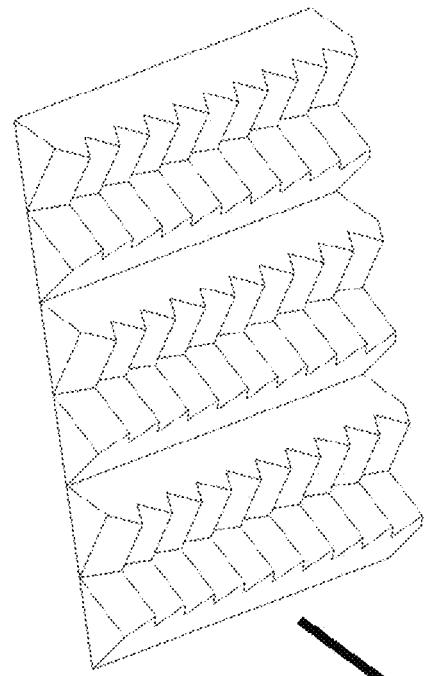
Fig. 17-B 2 Full-Cube Building Block with Rays
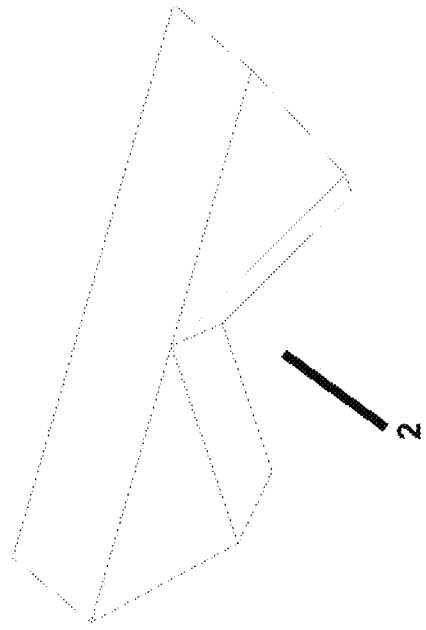
Fig. 17-C Array of Full-Cubes
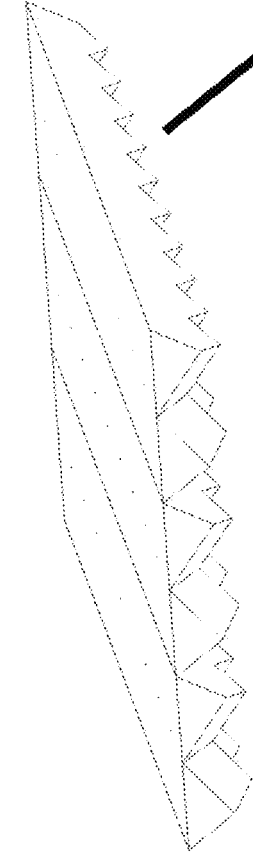
Fig. 17-D Array of Full-Cubes Fig. 18-A 2 From FHWA 2014 Traffic Sign Retroreflective Sheeting Identification Guide Fig. 18-B Photo of 3M DG3 Type XI Sheeting

RETROREFLECTIVE TRAFFIC STRIPE 1,000X BRIGHTER THAN THE CURRENT STATE OF THE ART

CROSS REFERENCE TO RELATED APPLICATIONS

This present application is a continuation application with the same specification as the parent non-provisional application which has received a notice of allowance and for which the issue fee has been paid. The parent application is application Ser. No. 16/891,258, entitled "Retroreflective Traffic Stripe 1,000× Brighter than the Current State of the Art," which was filed Jun. 3, 2020. The inventor claims this previous non-provisional application as the parent application for the present continuation application.

Two provisional patent applications were previously filed with the U.S. Patent and Trademark Office by the inventor each disclosing key elements of the present invention. Application No. 62/859,271, entitled "Retroreflective Material for Horizontal Road Markings Comprising Linear Light Turning Prisms over Cube Corner Retroreflective Prisms," was filed Jun. 10, 2019. Application No. 62/930,821, entitled "Optimal Configurations of Retroreflective Material for Horizontal Road Markings Comprising Linear Light Turning Prisms over Cube Corner Retroreflective Prisms," was filed Nov. 5, 2019. The inventor claims the respective filing dates of these provisional applications for the key elements disclosed in these respective provisional applications.

BACKGROUND OF THE INVENTION

This invention relates to retroreflective traffic stripes which are illuminated at night by the headlights of vehicles (cars, SUVs, trucks, and motorcycles) and which return a portion of the incident illumination by reflection to the drivers of these vehicles. Such traffic stripes are applied to or attached to the substantially horizontal surfaces of highways and widely used as (1) longitudinal lane delineation markers parallel to the lanes of traffic between lanes, (2) longitudinal road edge markers also parallel to the lanes of traffic, and (3) lateral markers perpendicular to the lanes of traffic at crosswalks and intersections. This invention further relates to retroreflective traffic stripes applied to the substantially vertical surfaces of guardrails and concrete barriers.

For present retroreflective traffic stripes used on road surfaces, the best approach to date is to embed glass or ceramic beads in the top surface of the white or yellow paint to achieve a small amount of retroreflection of the illumination of headlights back toward the driver of the vehicle. These beads are not very effective, especially in wet weather, and are easily broken or dislodged from the top surface of the paint by traffic running over them or by snowplows in colder climates. For present retroreflective traffic stripes used on guardrails and concrete barriers, the best approach to date is to deform the stripes to provide regions which stick outward from the guardrails or concrete barriers to provide a better incidence angle for the headlight beams. These deformed stripes are expensive, and installation is labor-intensive.

What is needed to provide exceptionally bright traffic stripes is a new optical material which can efficiently accept high incidence angle light from approaching headlights, turn this light by about 90 degrees, and send this light on to an array of cube corner retroreflective prisms, which then efficiently reverses the light path and sends the light back to the driver of the vehicle. The present invention elegantly fulfills this need, as described in the following paragraphs. By innovatively combining a top layer of light turning prisms with a bottom layer of prismatic cube corner retroreflective prisms in a critical optimal configuration, an extremely efficient, moderate cost new material for traffic stripes has been invented, which could save many lives on the highways of the world. The new traffic stripe offers 1,000 times the retroreflective brightness of conventional traffic stripes.

BRIEF SUMMARY OF THE INVENTION

This invention is a novel retroreflective traffic stripe comprising a widely spaced repeating pattern of linear light turning prisms over cube corner retroreflective prisms in a critical optimal configuration. The light turning prisms comprise at least two exposed surfaces, one approximately vertical facing the headlights of oncoming traffic, and another opposing the first and sloped by approximately 45 degrees. The approximately vertical surface efficiently accepts light from the headlights and transmits such light to the sloped surface which reflects such light downward whereafter such light intercepts an array of cube corner retroreflective prisms, which reflects such light upward in approximately the reverse direction. Such reflected light once more encounters the sloped face of the light turning prisms and is reflected toward the approximately vertical surface, whereafter such light exits and returns toward the headlights and, more importantly, toward the eyes of the driver of the vehicle.

The invention employs an array of cube corner retroreflective prisms below a widely spaced repeating pattern of light turning prisms in a unique optimized configuration to provide a new type of retroreflective traffic stripe, with 1,000× greater brightness than the current state of the art. The invention uses polymer micro-prismatic sheet made by well-established, high-speed, cost-effective, roll-to-roll embossing processes. The leading candidate materials for the micro-prismatic sheet are transparent robust polymers such as acrylic, polycarbonate, polyurethane, silicone, fluoropolymer, and combinations thereof.

The invention requires no metallization of the surfaces of the light turning prisms or the cube corner prisms, which perform their reflections using the well-known phenomenon of total internal reflection (TIR). TIR is ensured by using polymer materials with refractive indices above 1.4 and by surrounding the outside surfaces of the prisms with air. The candidate materials inherently meet the refractive index requirements (1.49 for acrylic, 1.58 for polycarbonate, 1.52 for polyurethane, 1.41 for silicone, 1.40 fluoropolymers such as ETFE).

The invention may be produced in various ways. The light turning prisms and the cube corner retroreflective prisms may be embossed onto individual microstructured polymer sheets and laminated together with a transparent adhesive, or they may be embossed on opposite sides of the same sheet of polymer.

The invention may use transparent films between the linear light turning prisms and the cube corner retroreflective prisms to impede moisture penetration into the retroreflective prisms.

The invention may also use films below the cube corner retroreflective prisms to impede moisture penetration and thereby create a dry air cavity in contact with the cube corner retroreflective prisms, thereby enabling such prisms to perform their reflective function using total internal reflection rather than metallic reflection. Alternately, these cube corner retroreflective prisms may be metallized with aluminum or silver or other metal to perform their reflective function using metallic reflection.

The invention may use either total internal reflection or metallic reflection on the sloped surfaces of the linear light turning prisms.

The invention may use an adhesive layer beneath the other layers to facilitate bonding of the material to the roadway surface.

The invention may be made in roll form to enable machine-aided continuous application of road stripes to long sections of highways and roads.

The invention may include a light turning prism configuration with a third surface connecting the vertical surface and the 45-degree sloped surface of the prism to provide traffic damage mitigation.

The invention may include features that protrude above the tops of the light turning linear prisms to resist the pressure of traffic tires and snowplows and thereby protect and prevent damage to the light turning prisms.

The invention may be used in a vertical orientation for placement on guardrails or walls next to the highway.

The invention may be used with light turning prismatic features facing opposite directions to be visible from vehicles traveling in both directions.

The invention may include a white back film to provide daytime brightness for the road stripe.

The invention may include colored pigment in the prismatic polymer material, such as yellow, red, or other colors to impart color to the retroreflected rays from headlights at night, or to the reflected rays from sunlight during the day.

The invention may include raised shoulders on the two long edges of the traffic stripe to further mitigate traffic damage.

The invention may include compliant layers beneath the road stripe to further mitigate traffic damage.

BRIEF DESCRIPTION OF THE DRAWINGS

FIG. 1 shows the present invention in multiple views. FIG. 1-A shows the invention from a driver's perspective for a longitudinal road stripe application such as a lane delineation marker or road edge marker, both of which extend lengthwise parallel to the direction of traffic. FIG. 1-B shows a cross-sectional view of a small portion of the invention, demonstrating the optical operation of the invention. FIG. 1-C shows a view of the invention for a longitudinal road stripe application. FIG. 1-C shows a view of the invention for a lateral road stripe application. For FIG. 1 and the remaining figures, the numerals shown in the drawings represent these key elements of the invention:

Figure 10:
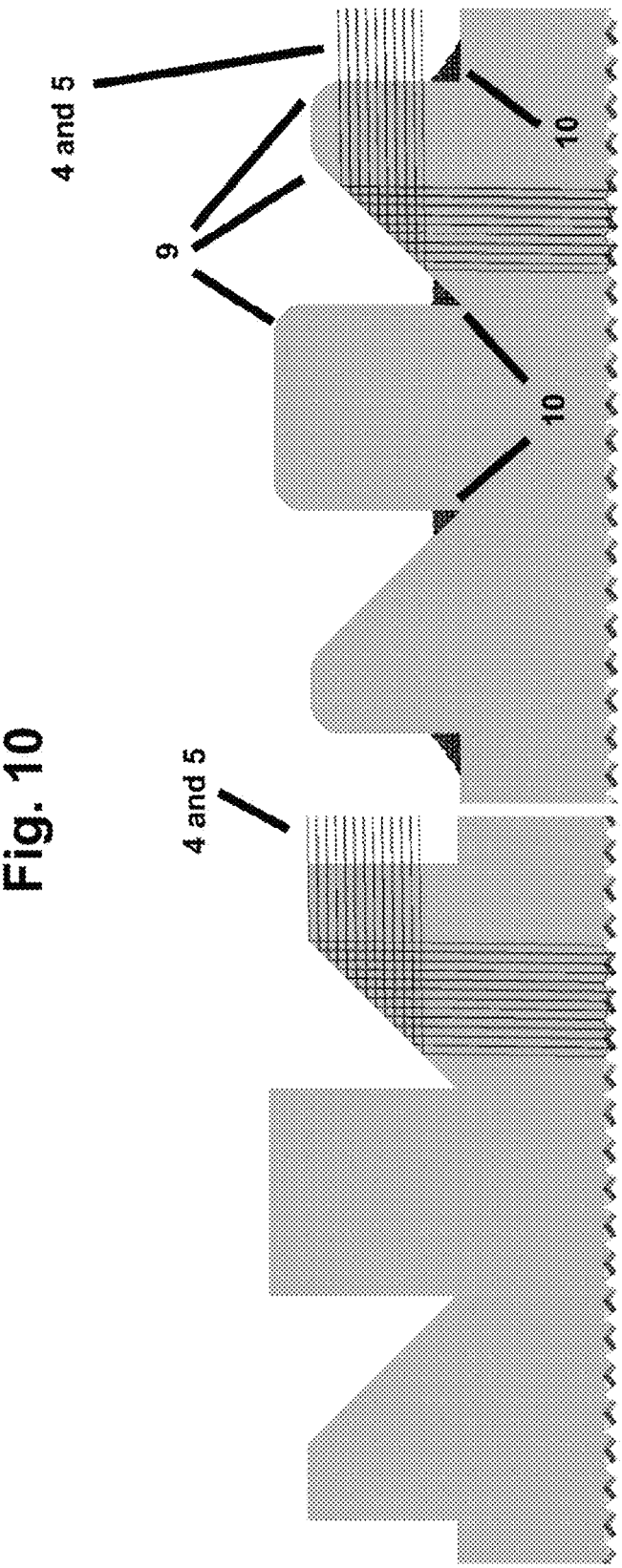

1 Light Turning Prism(s)
2 Cube Corner Prism(s)
3 Structural Bar(s)
4 Incident Rays
5 Retroreflected Rays
6 Raised Shoulders
7 Gaps for Rain Runoff
8 Compliant Base
9 Missing Corners
10 Dirt in Valleys FIG. 1-A shows the widely spaced repeating light turning prisms 1 extending across the traffic stripe.

FIG. 1-A also shows the raised shoulders 6 which mitigate traffic damage to the traffic stripe by contacting the tires of any vehicle which runs over the road stripe before such tires can contact the other components of the road stripe.

FIG. 1-A also shows gaps 7 in the shoulders 6 to allow rainwater run-off to the edge of the lane or road thereby minimizing accumulation of water on top of the traffic stripe.

FIG. 1-A also shows a compliant base 8 under the traffic stripe to further mitigate traffic damage.

FIG. 1-B shows the key elements of the invention and explains how it operates optically. Rays 4 from distant headlights enter the vertical face of the light turning prism 1 and proceed to intercept the sloped surface of the light turning prism 1, which reflects these rays downward. These rays then proceed to intercept an array of cube corner retroreflective prisms 2, which redirect the rays back upward in the opposite direction from which the rays arrived. The rays then again intercept the sloped surface of the light turning prism 1, which reflects the rays 5 back in the opposite direction from which the rays 4 initially arrived.

FIG. 1-B also shows some critical relative dimensions of the new invention. The cube corner prisms 2 must be much smaller in extent than the light turning prism 1 in the lengthwise direction of the traffic stripe shown as left to right in FIG. 1-B. For the preferred embodiment of FIG. 1-B, there are eight cube corner prisms 2 under one light turning prism 1, and six of these cube corner prisms 2 are illuminated by rays 4 which are retroreflected as rays 5 in the opposite direction. As will be fully explained later in this application, the new invention will not provide acceptable optical performance unless the cube corner prisms 2 are much smaller than the light turning prisms 1. As will also be fully explained later in this application, the new invention will not provide acceptable optical performance unless a substantial fraction of the cube corner prisms 2 are illuminated by the rays 4. To enable such illumination of a substantial fraction of the smaller cube corner prisms 2 by each of the larger light turning prisms 1, the lengthwise spacing between light turning prisms 1 must be large enough to prevent blockage of light from the distant headlights by neighboring light turning prisms 1, such that unblocked light can be delivered to a substantial fraction of the cube corner prisms 2.

FIG. 1-B also shows a structural element 3 which is taller than the light turning prism 2 to provide traffic damage mitigation, since vehicle tires will intercept the structural element 3 before intercepting light turning prism 2.

FIG. 1-B also shows a second light turning prism 1 on the left facing in the opposite direction from the light turning prism 1 on the right to provide bi-directional functionality for the traffic stripe. This configuration allows the traffic stripe to be equally visible for traffic moving in both directions along the highway, shown as left and right in FIG. 1-B.

FIG. 1-C shows a top isometric view of the new traffic stripe configured for longitudinal applications parallel to the road, such as lane delineation stripes and road edge stripes. The repeating pattern of light turning prisms 1 are spaced apart along the length of the traffic stripe, which is typically 10 cm (4 inches) wide.

FIG. 1-D shows a top isometric view of the new traffic stripe configured for lateral applications perpendicular to the road, such as crosswalk stripes or intersection stripes. The repeating pattern of light turning prisms 1 are spaced apart along the short 10 cm (4 inch) length of the traffic stripe, which typically has a width as wide as the road.

FIG. 2 shows a set of three-dimensional views of the optically functional prisms previously shown in cross section in FIG. 1-B. FIG. 2 clarifies the operation of the invention in three dimensions.

FIG. 2-A shows a transparent top view of the light turning prism 1, the array of cube corner prisms 2, the structural bar 3, and the incident rays 4 and reflected rays 5 which overlap one another while proceeding in their opposite directions. The ray paths have been calculated rigorously by the inventor.

FIG. 2-B shows an isometric top view of the light turning prism 1, the array of cube corner prisms 2, and the structural bar 3, with no rays shown.

FIG. 2-C shows a transparent bottom view of the light turning prism 1, the array of cube corner prisms 2, the structural bar 3, and the incident rays 4 and reflected rays 5 which overlap one another while proceeding in their opposite directions. The ray paths have been calculated rigorously by the inventor.

FIG. 2-D shows an isometric bottom view of the light turning prism 1, the array of cube corner prisms 2, and the structural bar 3, with no rays shown.

FIG. 3 shows the present invention in additional cross-sectional views for incident rays 4 coming from distant headlights located to the right of the views.

FIG. 3-A shows two adjacent sets of light turning prisms 1 and structural bars 3 spaced widely apart along the length of the traffic stripe. The spacing has been selected to prevent incident ray blockage by the set of prisms on the right for light heading toward the set of prisms on the left to fully illuminate six cube corner prisms 2 out of eight total cube corner prisms 2 under one light turning prism 1. Incident rays 4 and reflected rays 5 follow the same paths in opposite directions.

FIG. 3-B shows the paths of the rays 4 and 5 for the set of prisms on the left, including a blow-up view of the cube corner prisms 2.

FIG. 3-C shows the paths of the rays 4 and 5 above the set of prisms on the right. No ray blockage occurs by the structural bar 3 for the desired rays 4 and 5 because the spacing between adjacent sets of prisms on the left and right has been carefully chosen.

FIG. 4 shows the same cross-sectional views of the invention as FIG. 3, but for incident rays 4 coming from distant headlights located to the left of the views. The optical performance is the same for light arriving from either direction. FIGS. 4-A, 4-B, and 4-C present similar views as FIGS. 3-A, 3-B, and 3-C.

FIGS. 5-8 present the results of a parametric ray trace analysis by the inventor to fully understand and to optimize the configuration of the invention. The incident rays 4 arrive at a grazing angle of 1.24 degrees off horizontal, corresponding to illumination by headlights 0.65 meters above the road and 30 meters away. Each figure has four views, labeled -A, -B, -C, and -D. The A and B views correspond to full illumination of the light turning prism 1 from top to bottom of the vertical face. Such full illumination would require a spacing between sets of light turning prisms such that no blockage occurred by adjacent prisms of rays from distant headlights proceeding to the vertical face of the light turning prism 1. The C and D views correspond to half illumination of the light turning prism 1, namely, the top half of the vertical face. Such half illumination would require a spacing between sets of light turning prisms such that no blockage occurred by adjacent prisms of rays from distant headlights proceeding to the top half of the vertical face of the light turning prism 1.

The A and C views of FIGS. 5-8 correspond to perfectly aligned cube corner prisms 2 under light turning prisms 1. The B and D views of FIGS. 5-8 correspond to perfectly misaligned cube corner prisms 2 under light turning prisms 1.

For the perfectly aligned cases shown in the A and C views of FIGS. 6-8, all of the incident rays 4, shown with a diagonal hatch pattern from upper left to lower right, are successfully retroreflected in the reverse direction as reflected rays 5, shown with a diagonal hatch pattern from lower left to upper right, and no rays are lost by blockage or misdirection. The overlapping incident rays 4 and reflected rays 5 are shown by the overlapping hatch patterns. One exception to this rule is shown in FIG. 5-C. When only half of the vertical face of the light turning prism 2 is illuminated and only one aligned cube corner cube corner prism is used below the tilted surface of the light turning prism 1, all of the retroreflected light is lost by blockage by the next adjacent set of light turning prisms 1 and structural bar 3. This complete loss of performance for a half-illuminated light turning prism 1 over a single cube corner prism 2 under the tilted surface of light turning prism 1 is due to a unique optical feature of cube corner prisms. Light that enters the right half of the cube corner prism 2 departs from the left half of cube corner prism 2, and vice versa. This leads to an offset of the reflected ray bundle compared to the incident ray bundle equal to one half the length of the cube corner prism 2. FIG. 5-C shows that the incident rays 4 enter the cube corner prism 2 on the right side and leave on the left side, causing an offset in the reflected rays 5. This offset further leads to the bundle of reflected rays departing the light turning prism 1 through the bottom half of the vertical surface of the light turning prism 1. This bundle of reflected rays 5 will never make it back to the vehicle due to complete blockage by the next adjacent set of light turning prisms 1 and structural bars 3.

For the perfectly misaligned cases shown in the B and D views of FIGS. 5-8, a significant fraction of the incident rays 4, shown with a diagonal hatch pattern from upper left to lower right, are unsuccessfully retroreflected in the reverse direction as reflected rays 5, shown with a diagonal hatch pattern from lower left to upper right, and many rays are lost by blockage or misdirection. The successfully retroreflected overlapping incident rays 4 and reflected rays 5 are shown by the overlapping hatch patterns. The fraction of incident rays 4 which are lost is greatest for fewer cube corner prisms 2 below the sloped surface of the light turning prism 1. The fraction of incident rays 4 which are lost is greater for half illumination of the light turning prisms than for full illumination of the light turning prisms 2. Thus, the lost ray fraction is greater for the D views than for the B views and the lost ray fraction is greater for FIG. 5 than for FIG. 6, and greater for FIG. 6 than for FIG. 7, and greater for FIG. 7 than for FIG. 8.

Inspection of the results in FIGS. 5-8 for the misaligned cube corner prisms 2 shows two types of lost reflected rays. The first type of lost rays corresponds to reflected rays which escape the prismatic structure substantially vertically. The second type of lost rays corresponds to reflected rays which leave the light turning prism in the correct direction but too low, such that they will be blocked by the adjacent light turning prism 1 and taller structural bar 3, never reaching the vehicle. For example, FIG. 6-B shows 50% lost ray fraction due to vertical escape of reflected rays, while FIG. 6-D shows 100% lost ray fraction due to 50% vertical ray escape and 50% too low reflected rays 5.

FIG. 9 summarizes the results of the parametric ray trace analysis corresponding to FIGS. 5-8 in graphical form. The abscissa of each graph in FIG. 9 is the total number of cube corner prisms 2 below each light turning prism 1. The ordinate of each graph in FIG. 9 is the fractional loss of reflected rays 5 corresponding to incident rays 4. The worst-case fractional loss of reflected rays 5 compared to incident rays 4 is shown in FIG. 9-A, and corresponds to perfectly misaligned cube corner prisms 2 under light turning prism 1. The top curve of FIG. 9-A corresponds to half illumination of light turning prism 1, and the bottom curve of FIG. 9-A corresponds to full illumination of light turning prism 1.

Since the loss is zero for perfectly aligned cube corner prisms 2 under light turning prisms 1, for a wide variation in cube corner prism 2 alignment with light turning prism 1, from perfectly aligned to perfectly misaligned, the average loss would be expected to be about one-half of the worst case loss, as plotted in FIG. 9-B. Such a wide variation in alignment of prisms 1 and 2 is fully anticipated for mass-produced prismatic sheet material due to a variety of phenomena, including master tool diamond turning tolerances, production tool replication and assembly tolerances, differential thermal expansion/contraction of the tooling and polymer sheet during the thermal embossing process, shrinkage of the polymer from hot molten state to cool solid state, and cumulative tolerances along the length of a continuous roll of prismatic sheet material. The inventor has worked for several decades with world-class providers of diamond-turned master tools, electroform replicated production tooling drums, and roll-to-roll thermal embossing processing of polymer film into microstructured prismatic sheet. Precise alignment of all the cube corner prisms 2 with all the light turning prisms 1 for prismatic sheet material produced in rolls hundreds of meters long is not practical. Therefore, the configuration of the present invention needs to accommodate wide variation in alignment and misalignment.

The average loss shown in FIG. 9-B is about half as much for full illumination of the light turning prisms 1 compared to half illumination of the light turning prisms 1. However, full illumination is not desirable from practical considerations for the traffic stripe application. As shown in FIG. 10, dirt accumulation in the valleys next to the light turning prisms 1 will cause optical losses over the lower portion of the light turning prisms 1. Partial illumination of the light turning prism 1 can avoid the use of this lower portion of the light turning prism 1, mitigating dirt losses for the new traffic stripe.

To maximize the optical performance of the invention, the inventor seeks to keep the lost ray fraction below 10% by selecting a preferred embodiment shown by the X data point in FIG. 9-B. This preferred embodiment corresponds to eight cube corner prisms 2 under each light turning prism 1. This preferred embodiment further corresponds to 75% illumination of the light turning prism 1, such that six cube corner prisms 2 will be illuminated. The corresponding average fractional ray loss is seen to be about 8% in FIG. 9-B.

FIG. 10 shows more rationale for the preferred embodiment of the present invention. FIG. 10-A shows a pristine set of light turning prisms 1 corresponding to a newly installed traffic stripe. FIG. 10-B shows a damaged and dirty set of light turning prisms corresponding to a traffic stripe after much time in the field. The sharp corners on the light turning prisms 1 and the structural bar 3 have been worn down and are shown with missing and rounded corners 9. Dirt 10 has accumulated in the valleys on either side of the light turning prisms 1. Despite these changes, the reflected rays 5 still correspond to about two-thirds of the reflected rays 5 for the pristine sample. Therefore, if the pristine sample in FIG. 10-A provides 1,000× brighter retroreflectivity than current state of the art traffic stripes, as will be shown later, the damaged and dirty sample in FIG. 10-B will provide about 667× brighter retroreflectivity than current state of the art traffic stripes.

FIG. 11 shows the basic geometrical parameters which together describe the invention. The repeating pattern of light turning prisms 1 and structural bars 3 are spaced apart by spacing dimension S as shown in FIG. 11-A. The geometry involved in preventing blockage of incident rays 4 and reflected rays 5 is shown in FIG. 11-B. The number of illuminated cube corner prisms 2 is defined in FIG. 11-C. The general dimensions for the prismatic and structural elements of the invention are defined in FIG. 11-D. While the preferred embodiment has eight cube corner prisms 2 under the sloped surface of light turning prism 1 with six of these cube corner prisms 2 are illuminated, the inventor has established slightly less demanding design rules shown in FIG. 11 to bracket the general dimensions of the invention for good optical performance. The reason for using the angle 1.24° in the design rule for spacing S is further explained below.

FIG. 12 shows the actual dimensions of the preferred embodiment of the invention. The inventor selected these dimensions to enable the mass production of the embossed polymer sheet with light turning prisms 1 on one side and cube corner prisms 2 on the other side while starting with a polymer sheet about 0.075 cm thick before embossing. The inventor has confirmed with leading providers of tooling and roll-to-roll prismatic sheet embossing that these dimensions are practical for low-cost mass production of the invention. FIG. 12-A shows a side view of the invention including incident rays 4 and reflected rays 5. FIG. 12-B shows the same side view with the required spacing S of 3.55 cm to minimize blockage of incident rays 4 and reflected rays 5 by the adjacent set of light turning prisms 1 and structural bars 3 for the preferred embodiment. FIG. 12-B also includes blow up views of the dimensions of the critical elements of the preferred embodiment.

FIG. 13 describes the present state of the art in traffic stripes and shows examples of the retroreflective brightness. The Federal Highway Administration (FHWA) has proposed a rule that the minimum brightness of such traffic stripes should be 100 mcd/m$^2$-lux for all roadways in the United States with speed limits of 70 miles per hour and above. Many states have adopted this same standard. As shown by the photos in FIG. 13, this minimum brightness is not very bright. For comparison, the table in FIG. 13 shows the required retroreflective brightness of road signs to meet the FHWA standard for Type XI road sign sheeting. The values in the table are for different observation angles relative to the sign, and all of these values are more than 1,200× greater than the proposed value for traffic stripes discussed above. The new invention merely changes the direction of the incident rays 4 to direct these rays onto cube corner retroreflective prisms exactly like those used in Type XI road sign sheeting. Therefore, the reflected rays 5 will have the same retroreflective brightness for the new traffic stripe as for Type XI road sign sheeting except for fractional losses in reflected rays compared to incident rays. As discussed above, the preferred embodiment of the invention keeps such losses below 10%, enabling the retroreflective brightness to remain more than 1,000× greater than the minimum target for traffic stripes set in the proposed FHWA rule. This exceptional brightness will minimize lane departure accidents and save lives, especially for older drivers with reduced visual acuity.

Figure 14:
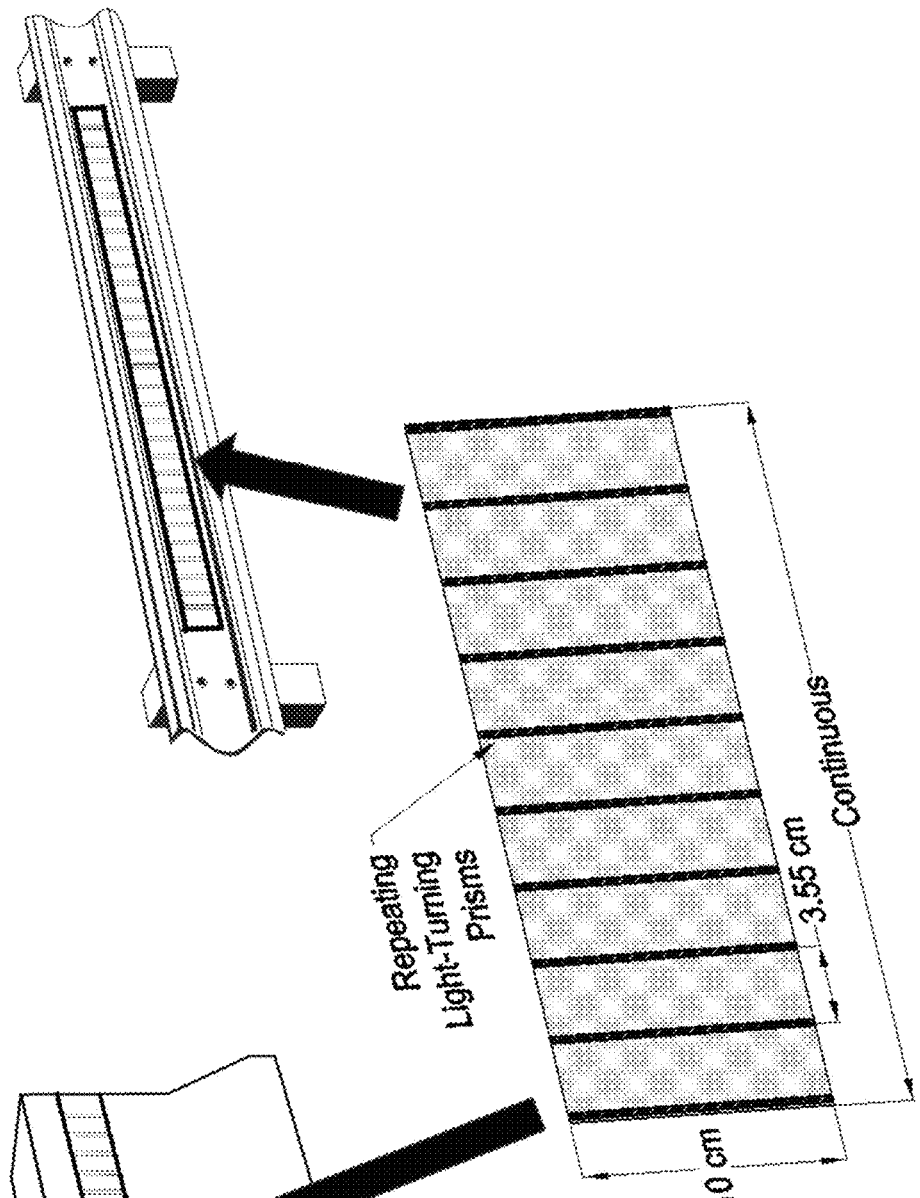

The new traffic stripe can not only be used as road stripes, including lane delineation marking stripes and road edge stripes and crosswalk stripes, but also as retroreflective traffic stripes on vertical concrete barriers and guard rails, as shown in FIG. 14. For such applications, the invention can be made in tape form and quickly and inexpensively applied to the concrete barriers and guardrails using a pressure sensitive adhesive to bond the traffic stripe to the concrete or metal structure, much like adhesive tape.

FIG. 15 shows the standard method of measuring traffic stripe retroreflectivity, documented in ASTM 1710 and equivalent international standards. The light is incident from headlights which are 0.65 meter above the road and 30 meters from the test location of the road stripe. The arctangent of 0.65 meter/30 meters=1.24°, establishing the design value previously shown in FIG. 11. This grazing angle of incidence is the reason that high retroreflectivity is so difficult to achieve for traffic stripes. One can easily compare the brightness of road signs to road stripes in a nighttime drive to experience the 1,000× higher brightness of the signs compared to the stripes. The test standard in FIG. 15 assumes the driver of the vehicle is 1.2 meters above the road. Standard test equipment is available from many vendors to simulate the geometry of FIG. 15 and make such retroreflectivity measurements. FIG. 15 also references the FHWA proposed design rule.

The mass production and application of cube corner retroreflective sheeting in road signs are well established technologies with many decades of history. Leading firms in this market area include 3M and Avery Dennison. Both firms have refined such cube corner retroreflective sheeting technology through multiple generation over multiple decades. The latest and brightness retroreflective sheeting product families are known as Diamond Grade 3 by 3M and Omnicube by Avery Dennison. Both families of products meet or exceed the retroreflective brightness standards for FHWA Grade XI sheeting previously shown in FIG. 13. Both families of products use an array of cube corners of a sophisticated configuration known in the industry as "full cube" retroreflective prisms. FIG. 16 explains this "full cube" technology in more detail.

A complete cube corner has three orthogonal faces which form a triangular aperture as shown in FIG. 16-A. When this aperture is illuminated, only two-thirds of it accepts and reflects incident rays from all three faces, sending the rays back toward the source of illumination. The other one-third of the rays only reflects the incident rays from two faces, not sending the rays back toward the source of the illumination. FIG. 16-B shows the dead areas in black corresponding to the non-retroreflecting portions of the complete cube corner. The live areas which retroreflect are shown in white.

FIG. 16-C shows that a rectangular portion of the live area can be trimmed from the complete cube corner and used as a 100% retroreflective "full cube" prismatic element. To enable tooling to be made to produce such full cube elements, two of these elements are often butted together to form a pair of full cube prisms. Such pairs of full cube prisms are then arrayed together to form a retroreflective prismatic sheet with 100% active area. In the preferred embodiment of the invention, such full cube prisms are preferred as the cube corner prisms 2 beneath the light turning prisms 1.

FIG. 17 shows the full cube prisms, pair of such prisms, and array of pairs of such prisms in three dimensional drawings. FIG. 17-A shows a pair of full cubes. FIG. 17-B shows the same pair of full cubes in transparent form with a few of the incident rays 4 and retroreflected rays 5. FIG. 17-C shows an array of pairs of full cubes from one view, while FIG. 17-D shows an array of pairs of full cubes from another view. While the present invention will work with other types of cube corner prisms, the best performance will be achieved with full cube technology in the cube corner prisms 2 beneath the light turning prisms 1. The previous figures have included full cube prisms as the lower set of prisms in the various embodiments of the invention.

Figure 18:
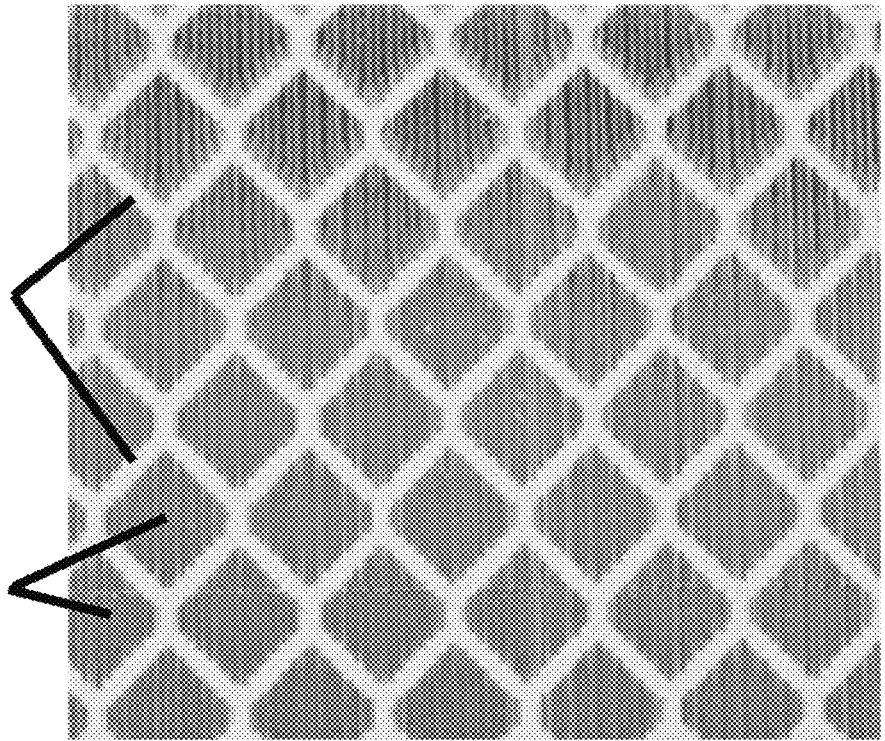

FIG. 18 shows currently available full cube retroreflective sheeting for road signs identified as Type XI. The two leading manufacturers of this Type XI sheeting are 3M and Avery Dennison. FIG. 18-A is excerpted from the FHWA sheet identification guide of 2014 and includes 3M's Diamond Grade 3 ® products and Avery Dennison's Omnicube® products. The white honeycomb pattern corresponds to the sealing bonds around individual air pockets which are required to enable total internal reflection (TIR) by the cube corner prisms. The honeycomb patterns are slightly different for the 3M and Avery Dennison products, but, in both cases, they block a significant fraction of the total area of cube corner retroreflective prisms. This blockage causes a significant loss in retroreflectivity on the order of 20-30%. The air pockets must be small, on the order of a few millimeters, to allow the sheeting to be trimmed to fit a variety of sign sizes and shapes. The trimming destroys the air pockets along the trim lines, and therefore large air pockets would result in too much dead area around the edges of the sign.

FIG. 18-B shows an enlarged photo of the 3M DG3 product, highlighting the cube corner prisms which appear dark in the photo and the air pocket seals which appear light in the photo. It is apparent that the seals block a substantial portion of the total area of the cube corner prisms, reducing performance proportionally. For the present invention, larger air pockets with much lower optical losses could be used since trimming is not necessary for traffic stripes.

DETAILED DESCRIPTION AND BEST MODE OF IMPLEMENTATION

The present invention is a novel retroreflective traffic stripe offering unprecedented brightness when illuminated by headlights from vehicles on highways. The invention comprises a thin transparent polymer sheet with prisms of two distinct types embossed onto the top and bottom surfaces of the sheet. The invention is best understood by referring to the attached drawings, which were briefly discussed in the previous paragraphs. FIG. 1 shows the basic configuration of the invention in various views.

FIG. 1-A shows a view as would be seen by the driver of a vehicle on a highway with the new traffic stripe mounted to the edge of the lane parallel to the direction of travel. The top surface of the traffic stripe includes light turning prisms 1 which are widely spaced along the length of the traffic stripe and are oriented perpendicular to the traffic stripe. These light turning prisms 1 have substantially vertical faces which are nearly perpendicular to the incident rays 4 from the headlights, allowing the incident rays 4 to be efficiently transmitted into the light turning prisms 1.

FIG. 1-B shows the cross-sectional configuration of the light turning prisms 1, including the vertical faces mentioned above. The incident rays 4 which enter the light turning prisms 1 proceed onward to a tilted face of the light turning prism which reflects the incident rays downward by the well-known process of total internal reflection (TIR).

The tilted face is tilted at approximately 45 degrees relative to both horizontal and vertical directions as shown in FIG. 1-B.

The rays which are reflected downward by the light turning prisms 1 proceed until these rays next intersect cube corner retroreflective prisms 2 on the bottom surface of the transparent polymer sheet. These retroreflective cube corner prisms 2 reflect the rays three successive times from their three orthogonal faces thereby returning the rays in the opposite upward direction. These three reflections by the cube corner prisms 2 also employ TIR. The reflected rays 5 next encounter the tilted surface of the light turning prism 1 which once again reflects the rays 5 to now direct them toward the right. These reflected rays then exit the vertical face of the light turning prism 1 in approximately the opposite direction of the incident rays 4.

Several critical features of the invention are also shown in FIG. 1-B. The reflective cube corner prisms 2 must be substantially smaller in length, shown as the left to right direction, than the light turning prisms 1. For the preferred embodiment shown in FIG. 1-B, eight of the smaller cube corner prisms 2 fit below the tilted face of light turning prism 1. In other words, the length of each cube corner prism is 87.5% smaller than the length of the tilted face in the left to right direction of FIG. 1-B.

To mitigate traffic damage of the light turning prisms 1, taller structural bars 3 are employed to encounter the surfaces of tires on vehicles traveling the roadway thereby minimizing tire contact on the shorter light turning prisms 1. In addition, the light turning prisms 1 are configured with flat tops to reduce internal stresses from tire contact within the light turning prisms 1. While pointed tops would work optically for light turning prisms 1, such pointed tops would represent high internal stress points under tire contact, and are not preferred for applications with potential traffic damage.

FIG. 1-A also shows additional critical features of the new invention when it is installed on a road surface. To further minimize traffic damage, taller shoulders 6 are employed to protect the shorter prismatic sheet material comprising the new traffic stripe. Such shoulders 6 can be made of many durable materials, such as the American Road Patch® material used to repair roads as described in U.S. Pat. Nos. 8,534,954 and 8,858,115. To facilitate rainwater runoff, intermittent gaps 7 are employed in the shoulders 6. To further mitigate traffic damage, compliant material 8 is employed between the prismatic polymer sheet and the roadway below. The entire road stripe assembly is attached to the road surface using one of several well-known type of adhesives, including pressure sensitive adhesive (PSA), liquid adhesives, hot adhesives, etc.

FIG. 1-C and FIG. 1-D show two different patterns of the light turning prisms 1 which are spaced apart on the top surface of the new traffic stripe. For longitudinal applications wherein the road stripe is parallel to the direction of the highway, such as lane delineation stripes and road edge stripes, the light turning prisms 1 are perpendicular to the road stripe, as shown in FIG. 1-C. For lateral applications wherein the road stripe is perpendicular to the highway, such as crosswalk stripes and intersection stripes, the light turning prisms 1 are parallel to the road stripe, as shown in FIG. 1-C. Road stripes are typically about 10 cm (4 inches) in the smaller dimension by much greater dimensions in the longer dimension, as shown in FIGS. 1-C and 1-D.

FIG. 2 shows the optical functionality of the invention in three dimensional views. These views are for a small portion of the road stripe comprising the light turning prisms 1, the structural bar 3, and the cube corner prisms 2. Incident rays 4 and retroreflected rays 5 are shown in two of the views and not shown in the other two of the views. FIG. 2-A is a transparent top isometric view with rays. FIG. 2-B is a top isometric view without rays. FIG. 2-C is a transparent bottom isometric view with rays. FIG. 2-D is a bottom isometric view without rays. FIG. 2 shows in three dimensions the same optical functionality of the invention previously shown in two dimensions in FIG. 1-B. FIGS. 1 and 2 taken together fully explain the configuration and optical functionality of the preferred embodiment of the invention to one of ordinary skill in the art of traffic stripes.

The thin transparent polymer film with embossed light turning prisms 1 on the top surface and with embossed cube corner prisms 2 on the bottom surface can be mass produced by at least two different methods. In the first method, two separate embossed films are made, one including the top light turning prisms 1 and the other including the bottom cube corner prisms 2. These two separate embossed films are then laminated together using a transparent bonding agent. This transparent bonding agent may be an adhesive such as pressure sensitive adhesive (PSA) or a liquid adhesive, a solvent which temporarily softens one or both of the surfaces to be joined, or an alternative agent. Many such bonding agents are known to those of ordinary skill in the art of laminating polymer layers together. In the second method, a single embossed film includes the light turning prisms 1 on the top surface and the cube corner prisms 2 on the bottom surface. The first method would allow the use of commercially available prismatic sheet for the bottom film, while the second method would be more cost effective in the long term.

FIG. 3 presents more details on the lengthwise distribution of the repeating pattern of light turning prisms 1 for optimal optical performance. For the preferred embodiment of the invention, six cube corner prisms 2 are illuminated of the eight total cube corner prisms 2 beneath the tilted surface of each light turning prism 1. To enable these six cube corner prisms 2 to be illuminated, the spacing between light turning prisms 1 and structural bars 3 must be selected to minimize ray blockage for both incident rays 4 and retroreflected rays 5. FIG. 3-A shows two adjacent sets of light turning prisms 1 and structural bars 3 including the wide spacing between these sets to minimize ray blockage. FIG. 3-B shows the optical functionality of one set of light turning prisms 1, structural bar 3, and cube corner prisms 2. Incident rays 4 and retroreflected rays 5 overlap one another as they proceed in opposite directions. FIG. 3-C shows the next adjacent set of light turning prisms 2 and structural bar 3. The spacing between sets has been chosen to prevent ray blockage by the adjacent set, as shown by the incident rays 4 and retroreflected rays 5 as they pass unimpeded over structural bar 3 in FIG. 3-C. The proper spacing between adjacent sets of light turning prisms 1 and structural bars 3 to minimize ray blockage for both incident rays 4 and reflected rays 5 while illuminating the proper number of cube corner prisms 2 is another critical feature of the invention.

FIG. 4 shows the same information as FIG. 3 for incident rays 4 arriving from the left instead of the right. FIGS. 3 and 4 taken together show the bi-directional functionality of the preferred embodiment of the invention.

FIGS. 5 through 8 present results of a parametric optical analysis by the inventor to determine the critical design rules for the invention to maximize performance. This parametric analysis led to the preferred embodiment of the invention and its unprecedented performance, which corresponds to 1,000 times the retroreflective brightness of the current state of the art. FIGS. 5 through 8 correspond to an increasing number of cube corner prisms 2 under the tilted surface of each light turning prism, from one to two to four to eight, respectively, of such cube corner prisms 2 under the tilted surface of each light turning prism 1.

Each of FIGS. 5 through 8 shows four different ray trace cases. The A-view shows the case where the cube corner As the number of cube corner prisms 2 beneath each light turning prism 1 increases, the lost ray fraction for the four cases in each of FIGS. 6, 7, and 8 improves. The table below summarizes the key results of the parametric study presented in FIG. 5-8. The average lost ray fraction is estimated by averaging the best case (A and C views of FIGS. 5-8) and worst-case lost ray fractions (B and D views of FIGS. 5-8).

| Number of Cube Corners Beneath Sloped Surface | Worst Case Lost Ray Fraction for All Cube Corners Illuminated | Worst Case Lost Ray Fraction for Half of Cube Corners Illuminated | Average Lost Ray Fraction for All Cube Corners Illuminated | Average Lost Ray Fraction for Half of Cube Corners Illuminated |
|---|---|---|---|---|
| 1 | 100% | 100% | 50% | 100% |
| 2 | 50% | 100% | 25% | 50% |
| 4 | 25% | 50% | 12.5% | 25% |
| 8 | 13% | 25% | 6.25% | 12.5% | prism(s) 2 are perfectly aligned with the light turning prism 1, which is fully illuminated from top to bottom of its vertical face. The B-view shows the case where the cube corner prism(s) 2 are perfectly misaligned with the light turning prism 1, which is fully illuminated from top to bottom of its vertical face. The C-view shows the case where the cube corner prism(s) 2 are perfectly aligned with the light turning prism 1, which is illuminated only over the top half of its vertical face. The D-view shows the case where the cube corner prism(s) 2 are perfectly misaligned with the light turning prism 1, which is illuminated only over the top half of its vertical face.

Bundles of incident rays 4 and reflected rays 5 are shown for all four cases (A, B, C, D) on all four figures (FIGS. 5, 6, 7, 8). Different hatch patterns are used for incident ray bundles and reflected ray bundles in each figure. The incident rays arrive at a grazing incidence angle of 1.24 degrees off horizontal, which corresponds to illumination by headlights 0.65 meters above the road 30 meters away. In other words, arctangent (0.65/30)=1.24 degrees. This angle corresponds to the standard test angle used in measuring the coefficient of retroreflectivity of road stripes in the U.S. and much of the world, as will be discussed in more detail below.

As discussed in the previous section, fractional losses of reflected rays compared to incident rays are due to one unusual aspect of reflection from cube corner prisms 2. Rays that enter the right side of the prism depart from the left side of the prism, and vice versa. This causes a substantial offset in position for the reflected rays 5 compared to the incident rays 4. This offset can lead to major losses of reflected rays 5 compared to incident rays 4. One type of loss is vertical escape of the reflected rays 5 from the prismatic structure. Another type of loss is blockage of reflected rays 5 by the next adjacent set of light turning prisms 1 and structural bar 3. The impact of these losses can be devastating to the optical performance. For example, FIG. 1-A shows no lost rays for one perfectly aligned cube corner prism 2 under the tilted surface of one light turning prism 1 with full illumination of the vertical face of the light turning prism 1. But FIG. 1-B shows that a misaligned cube corner prism 2 causes 100% loss of reflected rays for this same fully illuminated light turning prism 1. Furthermore, FIG. 1-C shows 100% loss of reflected rays 5 for a half-illuminated light turning prism with a perfectly aligned cube corner prism 2 beneath the tilted surface of the light turning prism 1. Still furthermore, FIG. 1-D shows 100% loss of reflected rays 5 for a half-illuminated light turning prism with one misaligned cube corner prism under the tilted surface of the light turning prism.

The average lost ray fraction values are the most important values in the table above because precise alignment between the tilted surface of each light turning prism 1 and the cube corner prisms 2 below this tilted surface is not practical for low-cost, roll-to-roll embossing of the polymer film or films used to produce the invention. The combined errors of diamond-turned master tools, electroformed replica production tools, assembled drums of replica tools used in the polymer embossing process, and the thermal polymer embossing process itself will not allow precise alignment between the tiny microstructured prisms over the great lengths of embossed traffic stripe film. For example, in the preferred embodiment, each cube corner prism is about 90 micrometers long. A repeating error of 1 micrometer in position for each cube corner prism relative to the tilted surface above it would correspond to a cumulative positional error of over 1 cm in just a meter of length of traffic stripe, and over 1 meter for a typical 100 meter roll of traffic stripe material. Similarly, a repeating error of 0.1 micrometer in relative position for each cube corner prism would correspond to a cumulative positional error of over 0.1 cm in just a meter of length of traffic stripe, and over 10 cm for a typical 100 meter roll of traffic stripe material. Since the relative difference in alignment between perfect alignment and perfect misalignment is only one half of the length of one cube corner prism or 45 micrometers, it is not practical to ensure perfect alignment between the cube corner prisms and the tilted surface of the light turning prism above. Therefore, the average lost ray fraction values in the table above will best characterize actual performance of the invention.

FIG. 9 shows the data in the table above in plotted graphical form. FIG. 9-A shows the worst-case loss for perfectly misaligned cube corner prisms 2 under the tilted face of the light turning prism 1 for both fully illuminated and half illuminated cases. FIG. 9-B shows the average loss between perfectly aligned and perfectly misaligned cube corner prisms 2 under the tilted surface of light turning prism 1 for both fully illuminated and half illuminated cases. The ordinate in the graphs of FIG. 9 is lost ray fraction for reflected rays 5 compared to incident rays 4. The abscissa is total number of cube corner prisms 2 under the tilted surface of light turning prism 1. The results in FIG. 9-B best represent the actual performance of the invention as discussed above since alignment of cube corner prisms 2 and the tilted surface of the light turning prisms 1 will vary from worst case to best case over short lengths of traffic stripe.

Note in FIG. 9-B that large numbers of cube corner prisms 2 under the tilted surface of light turning prisms 1 are essential to minimize losses. To achieve the desired 1,000× brightness advantage of the invention, such losses should be kept below 10%. This implies that six or more cube corner prisms 2 should be employed below the tilted surface of each light turning prism 1 even for full illumination, and even more cube corner prisms 2 are needed for less than full illumination.

Note that the lost ray fraction is smaller for full illumination than for half illumination. However, as will be discussed below, full illumination is not desirable from practical considerations of dirt buildup in the valleys of the exposed prismatic structure on the upper surface of the invention.

After consideration of the performance losses in FIG. 9-B and practical factors such as dirt buildup on the invention, the preferred embodiment uses eight cube corner prisms under the tilted surface of each light turning prism 1, and three-quarter illumination corresponding to six illuminated cube corner prism 2 under each light turning prism 1. The data point in FIG. 9-B using the symbol X shows the performance of the preferred embodiment, corresponding to about 8.3% lost ray fraction. The preferred embodiment will meet the 1,000× performance advantage goal of the invention.

FIG. 10 shows some practical considerations which lead to the preferred embodiment of the invention described above and shown in FIG. 10. FIG. 10-A shows the preferred embodiment in pristine new form. FIG. 10-B shows the preferred embodiment after traffic damage and dirt buildup in the field. Incident rays 4 and reflected rays 5 are shown in both views.

FIG. 10-B shows traffic damage as the rounding away of the sharp corners on the top of the prismatic structure. The rounded and partially missing corners 8 cause a loss in performance which is shown schematically by fewer successfully reflected rays 5. The incident rays 4 which are not successfully reflected by the rounded prismatic structure have been eliminated from FIG. 10-B for clarity. If 75% of the height of the light turning prism 1 remains functional after traffic abrasion, the invention will still provide 67% of its pristine new performance.

FIG. 10-B shows dirt buildup 10 in all the valleys between exposed prismatic structures. If such dirt buildup 10 only causes optical blockage and loss for 25% of the height of the light turning prism 1, no further loss will occur for the preferred embodiment which only uses the top 75% of the light turning prism. This is the justification for the selected design illumination value of 75% for the preferred embodiment. Note that if the pristine preferred embodiment in FIG. 10-A achieves 1,000× advantage in retroreflected brightness over the present state of the art in traffic stripes, then the damaged and dirty preferred embodiment in FIG. 10-B will still retain a 667× advantage over the present state of the art.

FIG. 11 summarizes the critical design features of the invention as discovered by the inventor. FIG. 11-A shows the side view of the invention including the critical spacing S between repeating patterns of light turning prisms 1 and structural bars 3. FIG. 11-B shows the same view including incident rays 4 and reflected rays 5. Note that the proper selection of the spacing parameter S will minimize blockage of incident rays 4 and reflected rays 5 while providing the illumination of the desired number of cube corner prisms 2.

FIG. 11-C shows a blowup of the optically functional prismatic structure, while FIG. 11-D shows the definitions of the critical general dimensions of this prismatic structure. The design rules for excellent optical performance are summarized in the rectangular box in FIG. 11. While the preferred embodiment comprises eight cube corner prisms 2 below the tilted face of each light turning prism 1 and six illuminated cube corner prisms 2 provided by the appropriate spacing S between repeating patterns of light turning prisms 1 and raised structural bars 3, the design rules cover slightly lower performing embodiments of the invention which will still provide much higher performance than the current state of the art traffic stripes. These design rules will be cited in the claims stated below.

FIG. 12 provides the specific dimensions of the preferred embodiment of the invention in sufficient detail to enable one of ordinary skill in the art of microstructured polymer embossing to practice the invention. FIG. 12-A shows a side view of the invention including incident rays 4 and reflected rays 5. FIG. 12-B shows the same side view with the required spacing S of 3.55 cm to minimize blockage of incident rays 4 and reflected rays 5 by the adjacent set of light turning prisms 1 and structural bars 3 for the preferred embodiment. FIG. 12-B also includes blow up views of the dimensions of the critical elements of the preferred embodiment. Selection of these dimensions by the inventor was made to enable extrusion embossing of a polymer sheet with a starting thickness of about 0.075 cm before the prismatic structures are embossed on the top and bottom surfaces. Such polymer sheets are available in roll form from a variety of vendors.

The spirit and scope of the invention is in no way limited to the specific dimensions shown in FIG. 12. The same performance can be achieved by scaling these specific dimensions either upward or downward in scale. The key elements of the invention are the relative dimensions of the repeating prismatic structures on the top and bottom surfaces, and the wide spacing between these repeating patterns. These key elements of the invention include: (1) a significant number of cube corner prisms 2 are present below the tilted surface of each light turning prism 1, (2) a substantial portion of these cube corner prisms 2 are illuminated by approaching headlights, and (3) the spacing S between repeating structures is large enough to enable the illumination of a substantial portion of the cube corner prisms 2 while minimizing blockage of incident rays 4 and reflected rays 5.

FIG. 13 shows why the invention should achieve 1.000× higher retroreflective brightness than the current state of the art for traffic stripes. The top half of FIG. 13 describes the current target value of 100 mcd/m$^2$-lux for road marking stripes proposed by the Federal Highway Administration (FHWA) which has been adopted by various states, and shows photos of road marking stripes of values close to this target. As seen in the photos, this target is not extremely bright, but it is still difficult to achieve and maintain with the present state of the art in traffic stripes. In contrast to road marking stripes, road signs typically offer more than 1,000× brighter retroreflective brightness as summarized in the table at the lower right of FIG. 13. The reason road signs can be made so much brighter is due to the much more normal incidence angle of the light from headlights onto signs compared to road markings. Cube corner retroreflective prismatic sheet works extremely well for near normal incidence light, but does not work for grazing incidence angle light. This explains why this prismatic retroreflective sheet technology used in road signs is not employed for road markings. The present invention overcomes this problem by changing the grazing incidence angle light from headlights into near normal incidence angle light onto the cube corner retroreflective prisms. The invention is thus a game changer in terms of enabling the advanced technology which is used all over the world in road signs to be used in traffic stripes. The widely space light turning prisms 1 essentially transform the grazing incidence angle rays 4 into near normal rays from the perspective of the cube corner prisms 2 below.

The table in the lower right of FIG. 13 summarizes the retroreflective brightness of Type XI retroreflective sign sheeting for a variety of observation angles up to 1 degree. All of these values exceed 120,000 mcd/m²-lux. As discussed above, the preferred embodiment of the invention limits blockage losses to less than 10%. Therefore, the retroreflective brightness of the new traffic stripes should be more than 90% times 120,000 mcd/m²-lux which is well over 100,000 mcd/m²-lux, more than 1,000× higher than the targeted minimum value at the top of FIG. 13.

While the greatest market for the invention is expected to be road marking stripes, including lane delineation stripes, road edge stripes, crosswalk stripes, and intersection stripes, many other applications will also be identified by those of ordinary skill in the art. These other applications fall within the spirit and scope of the invention. For example, the new traffic stripe can also be used on vertical surfaces such as concrete barriers and guardrails, as shown in FIG. 14. For these applications, the invention can be used in a tape form to minimize installation time and cost. The embossed polymer film with light turning prisms on one side and cube corner prisms on the opposite side can be unrolled and pressed against the concrete barrier or guardrail using a pressure sensitive adhesive (PSA) to provide the attachment. In essence, the installer will unroll a strip of traffic stripe tape, stick it onto the vertical structure, and walk away with the job done. These vertical applications are simpler and less demanding than road stripe applications, since no traffic damage will occur, and no rainwater runoff problems will be encountered for the former.

FIG. 15 shows the geometry of the standard test used in most countries to measure the retroreflective brightness of traffic stripes. In the U.S., this test is specified in ASTM 1710. The light source simulates headlights 0.65 meters above the road surface and 30 meters distant, together defining the 1.24-degree grazing ray angle relative to horizontal. In terms of the incidence angle of the light relative to a surface normal to the traffic stripe, the complementary angle of 88.76 degrees is the proper value. At such a high incidence angle, the retroreflective sheeting used in road signs will not work by itself for two reasons: (1) almost all the incident light will be reflected away at the top surface of the sheeting, and (2) any remaining light transmitted into the sheeting will not be properly retroreflected by the cube corner prisms due to the extremely high incidence angle.

Note also in FIG. 15 that the measurement point for retroreflected light is 1.2 meters above the road, where the driver of the vehicle is assumed to be located. Since the arctangent of 1.2/30=2.29 degrees and the arctangent of 0.65/30=1.24 degrees, the angle between the incident rays and the reflected rays to be measured is about 1.05 degrees. This observation angle is very close to the value in the fourth row of the table in FIG. 13 for road sign sheeting. Since the invention essentially changes the illumination angle from grazing to normal as far as the cube corner prisms are concerned, the expected retroreflective brightness of the invention will be within 10% of the 120,000 mcd/m²-lux value in that same fourth row of the table in FIG. 13.

The lower portion of FIG. 15 summarizes the target value of retroreflective brightness by the FHWA for highways with speeds above 70 miles per hour: 100 mcd/m²-lux. As discussed above, the invention will provide 1,000× this target value.

The target retroreflective brightness value for the invention of 1,000× the current targeted value of 100 mcd/m²-lux may seem excessive without further explanation. The inventor's rationale is two-fold. The much brighter traffic stripes will be much more visible to drivers of different types of vehicles from greater distances. This will reduce lane departure accidents and the serious injuries and deaths that often accompany these types of accidents. This first rationale is of greatest importance. A second rationale is that a 1,000× brighter traffic stripe will retain its life-saving brightness longer than conventional traffic stripes. Consider conventional road stripes which often degrade below the targeted value in months or very few years due to traffic damage and normal environmental degradation. For example, if a conventional road stripe has an exceptional brightness of 250 mcd/m²-lux when first installed, but degrades in brightness by 10% per month in the field, its remaining brightness will be reduced by a factor of about $0.9^{months}$. After 12 months, the reduction will be to about 28% of its initial brightness or 71 mcd/m²-lux. This value is below the targeted value. In contrast, if the same degradation rate applied to the present invention, which has an assumed initial brightness of 100,000 mcd/m²-lux, the reduction after 12 months will be to about 28,000 mcd/m²-lux, still 280 times the targeted value. Even after 48 months, the brightness of the invention will only fall to about 600 mcd/m²-lux, still six times higher than the target value. While we do not know the actual rate of degradation for the invention, which will no doubt vary widely with location, the higher initial brightness will allow much greater degradation over longer periods of time while still maintaining a brightness higher than the targeted values. Extending the lifetime of the traffic stripe will reduce life cycle costs, which include periodic replacement costs, while also saving lives over the full extended lifetime.

The invention employs a repeating pattern of widely spaced light turning prisms 1 on the top surface and an array of cube corner prisms 2 on the bottom surface of a transparent polymer sheet. Cube corner prisms have been used as traffic safety retroreflectors for about a century as shown for example by U.S. Pat. No. 1,671,086 in 1928. In recent decades, such cube corner prisms have been used in mass produced road sign sheeting which has evolved through various generations into a very high-technology family of products by major corporations including 3M and Avery Dennison. The brightest of such cube corner sheeting for road signs is classified as Type XI under ASTM D49562, as shown in FIG. 13. The brightest sheeting uses "full cube" cube corner reflective prisms. 3M calls their family of "full cube" retroreflective sheeting products Diamond Grade 3 ®. Avery Dennison calls their family of "full cube" retroreflective sheeting products Omnicube®. The preferred embodiment of the present invention will use "full cube" prisms on the bottom surface to maximize optical performance.

FIGS. 16 and 17 describe "full cube" prisms in more detail, since they are preferred for the invention. The invention will work with earlier forms of cube corner prisms, which clearly fall within the scope and spirit of the invention, but "full cube" technology is preferred for maximum retroreflective brightness.

FIG. 16-A shows a cube corner from the perspective of looking directly into the cube corner. The light gathering aperture is triangular in shape, and the three back faces are mutually orthogonal since they form a cube corner. When light enters the triangular aperture, it will be retroreflected only if it makes three successive reflections off the three back faces. Not all the light entering the triangular aperture makes three reflections. The corners of the triangular aperture are dead areas which do not retroreflect because light entering those areas does not make all three reflections. FIG. 16-B shows the dead areas in black. Full cube technology uses only a rectangular portion of the cube corner as shown in FIG. 16-C. This rectangular portion is called a full cube in the literature, since it fully retroreflects light entering its rectangular aperture. For ease in toolmaking, two full cubes are often used as a pair as shown in the lower right drawing of FIG. 16. Many such pairs of full cubes are then arrayed into sheet form as shown in the lower left drawing of FIG. 16. Such full cube sheets comprise the brightest available Type XI road sign sheeting.

FIG. 17 shows the full cubes in three-dimensional views. FIG. 17-A shows a pair of full cubes. FIG. 17-B shows the same pair of full cubes in transparent form with a few of the incident rays 4 and retroreflected rays 5. FIG. 17-C shows an array of pairs of full cubes from one view, while FIG. 17-D shows an array of pairs of full cubes from another view.

To perform their total internal reflection (TIR) function, the full cubes must be surrounded by air or another gas or vacuum with a refractive index of about 1.0. Manufacturers of full cube sheeting for road signs provide the needed air pockets in clever ways, generally using a printed honeycomb pattern of sealing bonds between the cube corner prismatic sheet and a separate film thereby creating air pockets in the individual honeycomb regions. FIG. 18 shows two of the leading product families of Type XI retroreflective sheeting for road signs.

FIG. 18-A is excerpted from the 2014 FHWA guide retroreflective sheeting identification guide. The 3M product family is known as Diamond Grade 3 ® and the Avery Dennison product family is known as Omnicube®. These two product lines have slightly different honeycomb patterns formed by the seals around air pockets. FIG. 18-B shows an enlarged photo of the 3M product highlighting the seals and the full cube prisms. The seals block a large fraction of the area of the cube corners, causing proportional losses in retroreflectivity. The large loss is due to the small size of each air pocket, typically a few millimeters in size.

This small size is required in road sign sheeting because road signs come in so many different sizes and shapes and the cube corner sheeting must be able to be trimmed to this wide variety of size and shapes. Larger air pockets would not be practical, since trimming destroys the air pockets along the trimmed edges, and the lost edge areas must be small relative to the sign area to maintain acceptable performance and appearance of the sign. For the present invention, the traffic stripes will be fixed in width with no trimming needed in this dimension. Furthermore, the traffic stripes will typically be long in length. Therefore, the air pockets can be much larger for the present invention than for road sign sheeting. This is important since the sealing bonds around the small air pockets in road sign sheeting typically obscure substantial portions of the cube corners, resulting in an optical loss of 20-30%. For the present invention, larger air pockets can reduce this loss substantially in a fully optimized embodiment of the invention.

The preferred embodiment of the invention will utilize air pockets between the cube corner prisms 2 and an underlying film which may be white to provide daytime visibility for the traffic stripe. The preferred embodiment may also include a colored pigment in the prismatic polymer sheet. For example, a yellow pigment can be used for yellow lane stripe applications and a red pigment may be used on certain guard rails stripes, if such colors are desired. Such colored pigments are already used in Type XI road sign retroreflective sheeting.

The invention will also typically employ additional layers beneath the film which provides the air pockets facing the cube corner prisms 2. Such additional layers may include pressure sensitive adhesive (PSA) to facilitate attachment to a highway or a guardrail. Such additional layers may include compliant layers to mitigate traffic damage to the prismatic structures used in the invention.

There are at least two acceptable methods of mass producing the prismatic polymer film employed in the invention. One method is to first produce a separate prismatic film containing the repeating pattern of light turning prisms 1 on one side of this first film, with the opposite side smooth and planar. The smooth and planar surface of the first film is then bonded to the smooth and planar upper surface of existing Type XI reflective sheeting described above using a transparent bonding agent such as solvent or liquid adhesive or pressure sensitive adhesive. The first film with light turning prisms 1 is produced by embossing a transparent polymer film, the same embossing method commonly used to produce the Type XI reflective sheeting. An alternate method of mass producing the prismatic polymer film is to simultaneously emboss both sets of prisms, namely the light turning prisms 1 on one side of the film and the cube corner prisms 2 on the opposite side of the film. This alternate method will require two embossing rolls corresponding to the two prismatic patterns rather than the normal one embossing with a prismatic pattern and another roll will a polished surface. The inventor has had discussions with long-time suppliers of prismatic sheeting and found that the simultaneous embossing is practical and cost-effective. The first method of producing the prismatic polymer film offers the benefit of using a proven product for the cube corner retroreflectors in the short term, but the second method will be more cost-effective in the long term.

While the above paragraphs have fully described the invention and its best mode of implementation so that one of ordinary skill in the art can practice the invention, many other variations and embodiments of the invention will become apparent to others of ordinary skill in the art based upon the disclosure of this invention. Such variations and embodiments fall within the scope and spirit of the invention.

I claim:

1. A retroreflective road stripe configured to be horizontally attached to a highway, said road stripe having a length parallel to the direction of traffic and a width perpendicular to the direction of traffic, said road stripe comprising the following:
   a. A substantially transparent polymeric material having an upper surface exposed to the ambient environment and a lower surface facing said highway below,
   b. Said upper surface including a plurality of linear light-turning prisms extending substantially across the width of said road stripe in a repeating pattern along the length of said road stripe, each of said light-turning prisms having three exposed faces,
      i. The first of said exposed faces is approximately vertical, between 70 and 90 degrees from horizontal, facing oncoming traffic
      ii. The second of said exposed faces is opposite said first face and inclined at approximately 45 degrees, between 32 and 52 degrees from horizontal, and having a horizontal length, L1
      iii. The third of said exposed faces is substantially horizontal connecting the tops of said first and second faces and having a horizontal length, L3 c. Said lower surface including a plurality of cube-corner retroreflective prisms,
  i. Said cube-corner prisms each having a horizontal length, L2
  ii. Said cube-corner prism horizontal length, L2, being at least 66% smaller than the said horizontal length, L1, of said second exposed face of said light-turning prisms
  iii. Said cube-corner retroreflective prisms being surrounded by air spaces below said prisms to enable total internal reflection by said prisms
d. Said repeating pattern of said light-turning prisms spaced apart along the length of said road stripe by a spacing, S, which obeys the inequality below:

$$S \geq \frac{2L2}{\tan(1.24°)} + L1 + L3.$$

2. The retroreflective road stripe of claim 1 comprising repeating pairs of said light-turning prisms facing in both directions of traffic.

3. The retroreflective road stripe of claim 1 wherein said polymeric material is selected from acrylic, polycarbonate, urethane, silicone, fluoropolymer, polyester, and combinations thereof.

4. The retroreflective road stripe of claim 1 wherein said light-turning prisms and said cube-corner prisms are formed into said polymeric material by a roll-to-roll embossing process of moldable polymer material proceeding between embossing rolls containing the reverse prismatic patterns to be embossed into said polymer film.

5. The retroreflective road stripe of claim 1 wherein said road stripe further comprises taller shoulder structures proximate to the two long edges of said road stripe to mitigate traffic damage to said road stripe.

6. The retroreflective road stripe of claim 1 wherein said road stripe further comprises compliant materials beneath said road stripe to mitigate traffic damage to said road stripe.

7. The retroreflective road stripe of claim 1 wherein said road stripe further comprises an enclosed air gap beneath said retroreflective cube corner prisms to promote total internal reflection therefrom.

8. A retroreflective road stripe configured to be horizontally attached to a highway, said road stripe having a length parallel to the direction of traffic and a width perpendicular to the direction of traffic, said road stripe comprising the following:
a. A substantially transparent polymeric material having an upper surface exposed to the ambient environment and a lower surface facing said highway below,
b. Said upper surface including a plurality of linear light-turning prisms extending substantially across the width of said road stripe in a repeating pattern along the length of said road stripe, each of said light-turning prisms having three exposed faces,
  i. The first of said exposed faces is approximately vertical, between 70 and 90 degrees from horizontal, facing oncoming traffic
  ii. The second of said exposed faces is opposite said first face and inclined at approximately 45 degrees, between 32 and 52 degrees from horizontal, and having a horizontal length, L1
  iii. The third of said exposed faces is substantially horizontal connecting the tops of said first and second faces and having a horizontal length, L3 c. Said lower surface including a plurality of cube-corner retroreflective prisms,
  i. Said cube-corner prisms having a horizontal length, L2
  ii. Said cube-corner prism horizontal length, L2, being at least 66% smaller than the said horizontal length, L1, of said second exposed face of said light-turning prisms
  iii. Said cube-corner retroreflective prisms being surrounded by air spaces below said prisms to enable total internal reflection by said prisms
d. Said upper surface of said light-turning prisms accompanied with additional taller linear structural elements of height, Hmax, and horizontal length, L4, located nearby and parallel to said light-turning prisms on the opposite side of said light-turning prisms from said first vertical face which faces oncoming traffic
e. Said repeating pattern of said light-turning prisms and said taller structural elements spaced apart along the length of said road stripe by a spacing, S, which obeys the inequality below:

$$S \geq \frac{H\max - L1 + 2L2}{\tan(1.24°)} + L1 + L3 + L4.$$

9. The retroreflective road stripe of claim 8 comprising repeating pairs of said light-turning prisms facing in both directions of traffic.

10. The retroreflective road stripe of claim 8 wherein said polymeric material is selected from acrylic, polycarbonate, urethane, silicone, fluoropolymer, polyester, and combinations thereof.

11. The retroreflective road stripe of claim 8 wherein said light-turning prisms and said cube-corner prisms are formed into said polymeric material by a roll-to-roll embossing process of moldable polymer material proceeding between embossing rolls containing the reverse prismatic patterns to be embossed into said polymer film.

12. The retroreflective road stripe of claim 8 wherein said road stripe further comprises taller shoulder structures proximate to the two long edges of said road stripe to mitigate traffic damage to said road stripe.

13. The retroreflective road stripe of claim 8 wherein said road stripe further comprises compliant materials beneath said road stripe to mitigate traffic damage to said road stripe.

14. The retroreflective road stripe of claim 8 wherein said road stripe further comprises an enclosed air gap beneath said retroreflective cube corner prisms to promote total internal reflection therefrom.

15. A retroreflective traffic safety stripe configured to be vertically attached to a highway barrier or guardrail proximate to and parallel to the edge of said highway, said traffic safety stripe having a length parallel to the direction of traffic and a width perpendicular to the said length, said traffic safety stripe comprising the following:
a. A substantially transparent polymeric material having an upper surface exposed to the ambient environment and a lower surface facing said highway barrier beneath,
b. Said upper surface including a plurality of linear light-turning prisms extending substantially across the width of said road stripe in a repeating pattern along the length of said road stripe, each of said light-turning prisms having three exposed faces, i. The first of said exposed faces is approximately vertical, between 70 and 90 degrees relative to said upper surface, facing oncoming traffic
ii. The second of said exposed faces is opposite said first face and inclined at substantially 45 degrees relative to said upper surface, between 32 and 52 degrees from said upper surface, and having a horizontal length, L1
iii. The third of said exposed faces is substantially vertical connecting the tops of said first and second faces and having a horizontal length, L3
c. Said lower surface including a plurality of cube-corner retroreflective prisms,
   i. Said cube-corner prisms each having a horizontal length, L2
   ii. Said cube-corner prism horizontal length, L2, being at least 66% smaller than the said horizontal length, L1, of said second exposed face of said light-turning prisms
d. Said repeating pattern of said light-turning prisms spaced apart along the length of said traffic safety stripe by a spacing, S, which obeys the inequality below:

$$S \geq \frac{2L2}{\tan(1.24°)} + L1 + L3.$$

16. The retroreflective traffic safety stripe of claim 15 comprising repeating pairs of said light-turning prisms facing in both directions of traffic.

17. The retroreflective traffic safety stripe of claim 15 wherein said polymeric material is selected from acrylic, polycarbonate, urethane, silicone, fluoropolymer, polyester, and combinations thereof.

18. The retroreflective traffic safety stripe of claim 15 wherein said light-turning prisms and said cube-corner prisms are formed into said polymeric material by a roll-to-roll embossing process of moldable polymer material proceeding between embossing rolls containing the reverse prismatic patterns to be embossed into said polymer film.

19. The retroreflective road stripe of claim 15 wherein said traffic safety stripe further comprises an enclosed air gap beneath said retroreflective cube corner prisms to promote total internal reflection therefrom.

* * * * *